US012487982B2

(12) United States Patent
Michel et al.

(10) Patent No.: US 12,487,982 B2
(45) Date of Patent: Dec. 2, 2025

(54) FAST REUSE OF LOCKING DATA STRUCTURES PRIOR TO MOVEMENT OF ENTRIES TO A CACHE FREE LIST

(71) Applicant: Oracle International Corporation, Redwood Shores, CA (US)

(72) Inventors: Francisco Rafael Flores Michel, Belmont, CA (US); Andrew Stuart Ingham, Romsey (GB); Wilson Wai Shun Chan, San Francisco, CA (US); Yu Kin Ho, Fremont, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 18/649,899

(22) Filed: Apr. 29, 2024

(65) Prior Publication Data
US 2025/0335419 A1    Oct. 30, 2025

(51) Int. Cl.
*G06F 16/23* (2019.01)
*G06F 16/2455* (2019.01)
*G06F 16/25* (2019.01)

(52) U.S. Cl.
CPC .... *G06F 16/2343* (2019.01); *G06F 16/24562* (2019.01); *G06F 16/256* (2019.01)

(58) Field of Classification Search
CPC ........... G06F 16/2343; G06F 16/24562; G06F 16/256
See application file for complete search history.

(56) References Cited

U.S. PATENT DOCUMENTS

| 2016/0110403 A1* | 4/2016 | Lomet | G06F 16/2255 |
| | | | 707/695 |
| 2018/0218023 A1* | 8/2018 | Fanghaenel | G06F 16/2343 |
| 2023/0244649 A1* | 8/2023 | Helland | G06F 16/2272 |
| | | | 707/741 |

OTHER PUBLICATIONS

"Oracle8 i Parallel Server: Concepts and Administration, Release 8.1.5," Oracle, dated Feb. 1999.
Caulfield, C., "Programming Locking Applications," RedHat document, initially published Oct. 2007.
Yoon, D., et al., "Distributed Lock Management with RDMA: Decentralization without Starvation," SIGMOD' 18, Jun. 10-15, 2018, Houston, TX, USA @ 2018 Association for Computing Machinery, ACM ISBN 978-1-4503-4703-7/18/06.
Moser, C., et al., "OpenVMS Locking ConceptsLocking Concept," dated Jun. 20, 2005.

(Continued)

Primary Examiner — Loc Tran
(74) Attorney, Agent, or Firm — Vista IP Law Group, LLP

(57) ABSTRACT

A computer program product, system, and computer implemented method for fast reuse of locking data structures prior movement of entries to a cache free list. The approach disclosed herein enables management of lock management structures. Specifically, the approaches provided herein are directed towards use of lock management structures where items are managed using at least a recycle list. A recycle list and a resource list pair associated with the recycle list are controlled using a single latch, where there are any number of buckets that each include a recycle list and a resource list pair. In addition, in some embodiments, a free list is also maintained, whereas resource lists and recycle lists have a one-to-one relationship with each other, the free list has a one-to-many relationship with the buckets and lists therein.

20 Claims, 20 Drawing Sheets

(56) References Cited

OTHER PUBLICATIONS

Gao, J., et al. "Citron: Distributed Range Lock Management with One-sided RDMA," Proceedings of the 21st USENIX Conference on File and Storage Technologies, Feb. 21-23, 2023 • Santa Clara, CA, USA.
Chung, Y. et al., "Using RDMA for Lock Management," dated Jul. 2015.
Zehnder, S., "Eth Library A Scalable Distributed Lock Manager using One-Sided RDMA Atomic Operations," Master Thesis, ETH Library, dated 2015.
Chen, Q., et al., "SeqDLM: A Sequencer-Based Distributed Lock Manager for Efficient Shared File Access in a Parallel File System," SC22, Nov. 13-18, 2022, Dallas, Texas, USA.
"Distributed Lock Manager," OpenVMS Engineering, dated Mar. 2000.
Burrows, M., "The Chubby lock service for loosely-coupled distributed systems," Google Inc., dated Dec. 6, 2006.

* cited by examiner

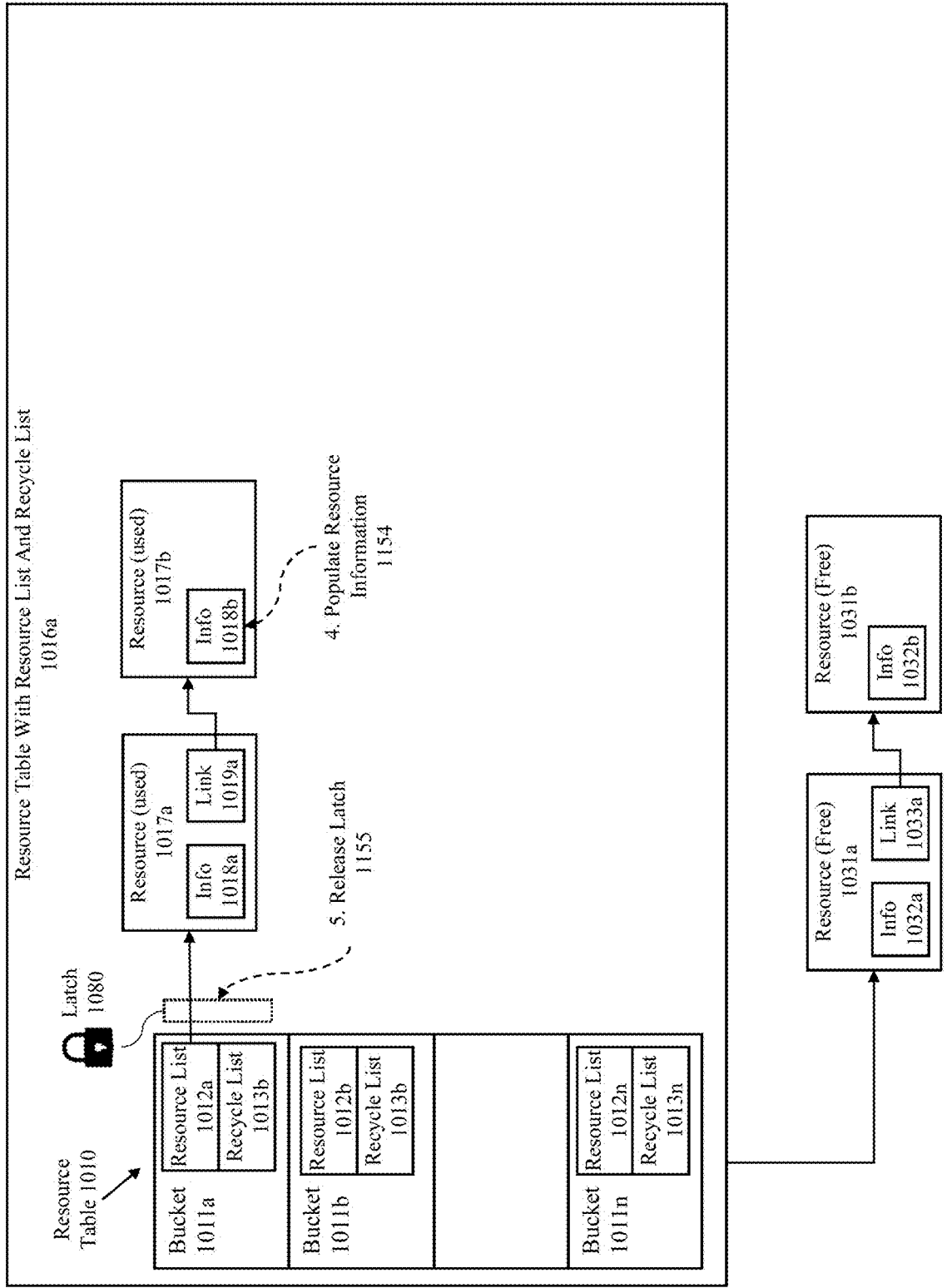

FAST REUSE OF LOCKING DATA STRUCTURES PRIOR TO MOVEMENT OF ENTRIES TO A CACHE FREE LIST

BACKGROUND

Many modern computer systems comprise a collection of computer nodes that execute a large number of processes at any given time. Each process may require access to one or more resources that are shared (such as data). Furthermore, there may be any number of levels of processes that are required for utilization of the shared items. Likewise, there can be any number of processes that attempt to gain access to those resources at any given time.

Generally, to address this problem, most systems use locks, where each process, to gain access to a resource, requests a lock (or a corresponding request) on that resource. This allows the process access where no other process will interfere with their access—e.g., the other processes are not allowed to modify the resource. Such an approach might provide exclusive locks or other types of locks that may allow other resources to access but not modify said resource. Other types of locks may be utilized as well.

Management of these locks can be cumbersome at best when a single resource is in charge of managing all locks on any given resource in a system comprising multiple computing nodes. This is complicated further when modifying one resource might require the modification of another resource as both resources will require a lock. This increases the difficulty in managing these resources, but also increases the time that each operation takes.

Management of locks is further complicated when a process on one computing node wants to access a resource owned by another computing node. For instance, such an approach might require not only a lock on two management structures—e.g., one on or for each respective node. This is further complicated by the actual structures used to manage said locks as allocation of a new lock or release of a lock generally requires modification of one or more parts of said management structure.

Therefore, there is a need for an improved approach to perform lock management.

SUMMARY

Embodiments of the present disclosure provide a method, apparatus, and product for fast reuse of locking data structures prior movement of entries to a cache free list.

The approach disclosed herein generally comprises management of lock management structures. Specifically, the approaches provided herein are directed towards lock management structures where items (e.g., resources such as data) are managed using at least resource lists and recycle lists. Each resource list is associated with a corresponding recycle list where a resource list and its corresponding recycle list can be controlled using a latch that is shared by the two lists. Additionally, different resource lists and their corresponding recycle lists are managed with different latches. For example, a number of buckets may be provided where each bucket has a resource list and a corresponding recycle list, and modification of the lists in the bucket are managed using a latch that is unique to a particular bucket. In this way, two lists (resource and recycle lists) can be managed in an efficient manner where there are any number of buckets that each include a recycle list and a resource list. In addition, in some embodiments, a free list is also maintained. However, whereas resource lists and recycle lists have a one-to-one relationship with each other, the free list has a one-to-many relationship with the buckets and lists therein and therefore requires a separate latch from those used to manage the resource and recycle lists. The approach provided herein avoids some of the overhead that is required to manage a resource list when a free list is provided but not a recycle list as many requests for lock grant and release can be processed without requiring acquisition of two latches (e.g., a latch for the corresponding bucket and another latch for the free list).

Further details of aspects, objects and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. To better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

FIGS. 11A-11B illustrate allocation and population of an entry from a corresponding recycle list according to some embodiments.

DETAILED DESCRIPTION OF THE EMBODIMENTS OF THE DISCLOSURE

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated. Additionally, any element identified by the same reference number is associated with the same description unless specified herein.

Figure 1:
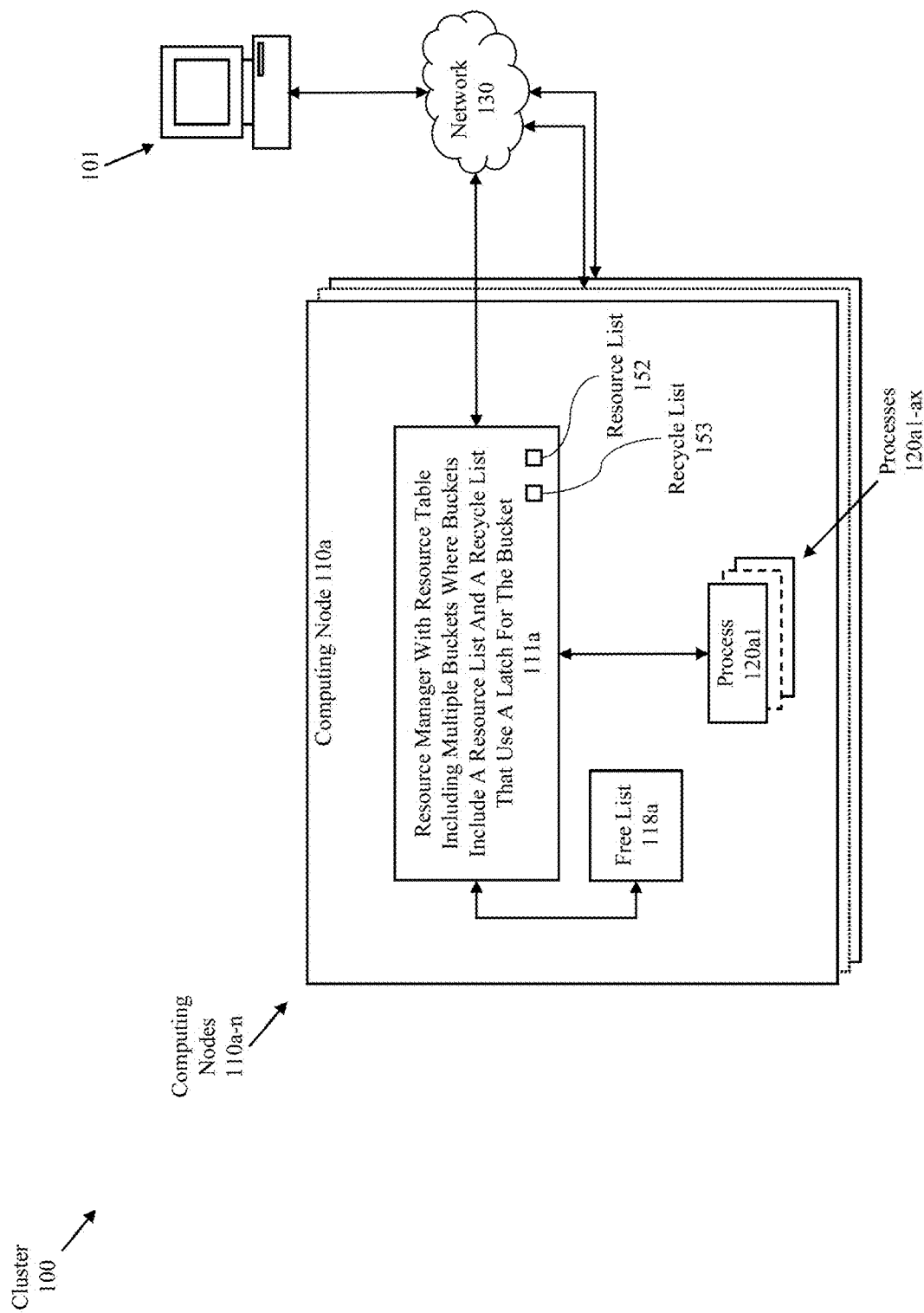
FIG. 1 illustrates an example system in which some embodiments of the disclosure are implemented.

FIG. 1 illustrates an example system in which some embodiments of the disclosure are implemented. Generally, the system includes one or more computing nodes that are interconnected and that might each include a resource management component or module for managing the grant and removal of locks on resources that may be shared across different processes as discussed herein The system comprises a cluster 100 that includes a computer device 101, computing nodes 110a-n, and a network 130. Each computing node 110a-n might manage access to data or resources using at least a lock management approach. The data and resources can comprise any combination of data (e.g., data in an object or relational database or consolidated database instances) or any other resources that may be accessible to one or more processes.

In some embodiments, the computing device 101 interacts with any of the computing nodes (see e.g., 110a-n). For instance, a computing device might be usable to connect to and access data managed by the cluster via one of the computing nodes. Furthermore, such access might require or utilize one or more interfaces. The computing device might also be usable to control one or more processes on a respective computing node (see e.g., 120a1-ax). In some embodiments, there may be any number of computing devices that can interface with the cluster 100 at any given time and allow for the control of one or more corresponding processes either directly or indirectly. Furthermore, the computing devices might be controlled by a user, another service, an administrator, or comprise any other computing device that allows data access or management of the computing nodes or an element therein.

The computing device 101 comprises any type of computing device that may be used to operate or interface with a computing node, whether directly or indirectly. Examples of such user computing devices 101 include workstations, personal computers, laptop computers, or remote computing terminals. User computing devices 101 may also comprise any type of portable tablet device, including for example, tablet computers, and portable readers. User computing device 101 may also include mobile telephone devices relating to any mobile device that can suitably access any computing systems on the Internet such as smartphones and programmable mobile handsets. It is noted that the disclosure is not limited in its application to just these types of devices. The embodiments of the disclosure are applicable to any computing device that works in conjunction with access to digital information stored on, as an example, the Internet.

One of ordinary skill in the art may appreciate that embodiments of this present disclosure may be implemented on the Internet, on a closed network, on a hybrid open and closed network, or on a cloud network.

In some embodiments, the computing device 101 and the computing nodes are interconnected to each other over a network (see 130). The network might comprise a local area network, a wide area network, a connection over the internet, a dedicated backhaul, or any combination thereof. Additionally, each computing node (see 110a-n) might be able to communicate over the network 130—e.g., to other computing nodes.

In some embodiments, each computing node (see e.g., 110a-n) includes one or more processes (see 120a1-ax) that interact with the computing node to access resources therein or resources on another node—e.g., process 120a1 on computing node 110a might access resources on the computing node 110a or on another computing node (e.g., 110e). Such processes may be used to execute any task as is appropriate, such as user or frontend processes and administrative or backend processes. Such access may require one or more locks—e.g., locks on resources to be modified.

In some embodiments, a resource manager is provided with a resource table that includes multiple buckets, where each bucket includes a resource list, a recycle list, and a latch that is shared by the resource list and recycle list (see e.g., 111a). With regard to the resource list, it might comprise a collection of entries each with information such as information that identifies a respective resource, any locks on the resource, what process holds each lock, the type of each lock, a queue of pending lock requests, or some combination thereof. The collection of information can be organized in any way such as in a data structure, a table, a list, a linked list, or any other appropriate form (see e.g., resource list 152). Additionally, in some embodiments, each resource corresponds to an entry and each entry is associate with a portion of storage (e.g., of a random access memory, or of a caching structure), where upon activity with regard to a resource not previously subject to a lock, a new entry is allocated and populated, and where upon or after release of all locks to that resource, the entry can be recycled. For example, an entry that is no longer needed (e.g., one without any current or pending locks) might be moved to a recycle list (see e.g., recycle list 153) for later reuse. In order to manage the modification of either the resource list (152) or the recycle list (153) a latch is required to avoid conflicting writes. Generally, in order to facility access and avoid conflicts, the approach provided herein utilizes multiple resource lists and recycling lists, where a pair (as in one resource list and one corresponding recycle list) of the resource lists and recycling lists are included in a bucket and modification of information in the bucket requires the acquisition of a latch. By placing the resource list and the recycle list under the same latch an entry can be added to one of the lists and removed from the other list without getting a separate latch. This avoids waiting for acquisition of another latch when a new allocation needs to be made or when a de-allocation needs to be made. This is of particular importance when the allocations and de-allocations are to and from a single list (e.g., the free list) that is utilized by multiple buckets because acquisition of a lock to the freelist presents a single bottleneck any may be associated with delays and contentions.

The resource manager may also interact with a free list (see e.g., 118a) which is a list of free entries. Such entries can be moved to any one of the resource lists at any given time. Likewise, entries can be moved from a resource list or a recycling list to the free list—e.g., based on a set of memory or entry management rules. However, in contrast to the movement of entries between a given resource list and a corresponding recycle list, modification of the free list and thus movement of entries between lists requires a second latch. Thus, while the resource and recycle lists have a one-to-one relationship each other, they have a many to one relationship to the free list.

Figure 2:
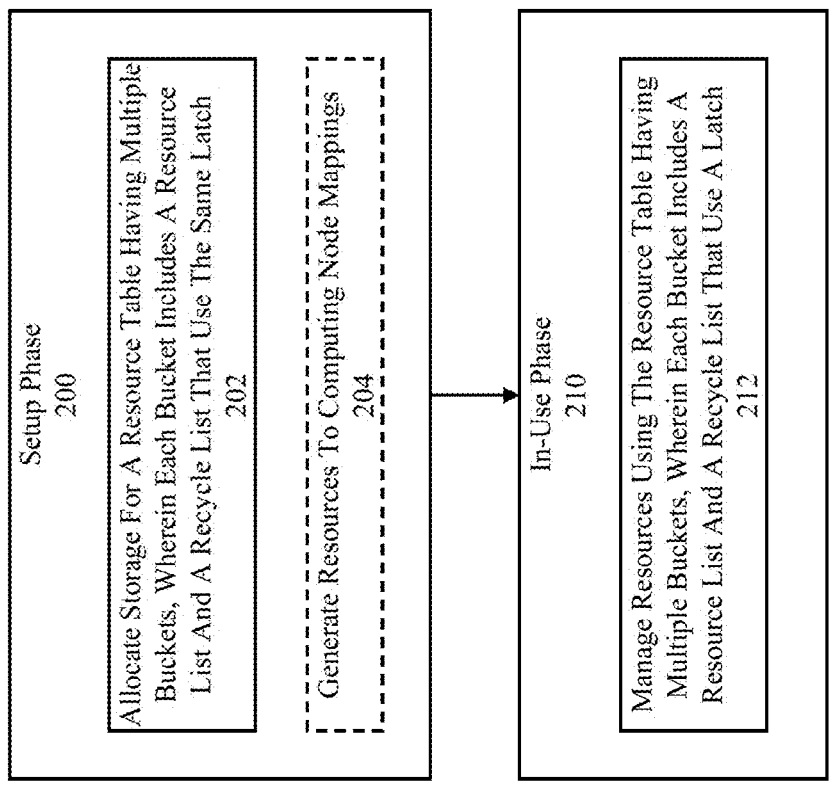
FIG. 2 is a flowchart for fast reuse of locking data structures according to some embodiments.

FIG. 2 is a flowchart for fast reuse of locking data structures according to some embodiments. Generally, the process includes two phases. In a first phase relevant information for lock management on resources is gathered. In a second phase, that information is used to manage those locks and the entries used for said management.

The process generally starts at 200 in a setup phase. In some embodiments, at 202, the process includes allocating storage for a resource table as discussed herein. For instance, each computing node that is to participate in the management of locks on resources might allocate memory and construct data structures for lock management. According to some embodiments, the data structures might comprise a table having multiple buckets where each bucket includes a resource list and a recycle list that use the same latch. Such buckets might be seeded with a number of entries based on a rule or policy—e.g., unused entries in the recycle list.

Additionally, at 204, the setup phase might include a resource identification or mapping function. For instance, each node with a resource to offer for management might create mapping information that relates individual resources to individual computing nodes that are the masters of those resources. As will be discussed further herein, said mapping information is usable by computer nodes to determine what computing node from which to request a lock to access any particular resource.

In some embodiments, the resources are also mapped to respective buckets based on a hash function or other information. Furthermore, in some embodiments, a resource count might be used to guide the creation of the resource table such that the number of buckets therein is proportional to the number of resources. Additionally, each resource may be mappable to a name or identifier which can be used to determine which bucket would have information regarding any locks on the resource.

After the setup phase, the process moves to an in-use phase at 210. As provided herein, the resources are managed during the in-use phase using the resource table having the multiple buckets, where each bucket includes a resource list and a recycle list that use a latch that is shared by the lists in the bucket as discussed herein. Such management operations might include processing lock requests, lock releases, and management of the resource table and free list to maintain efficient use of memory, cache, or storage. As provided herein, such approaches may include moving entries between corresponding resource and recycle lists using a single corresponding latch.

Figure 3:
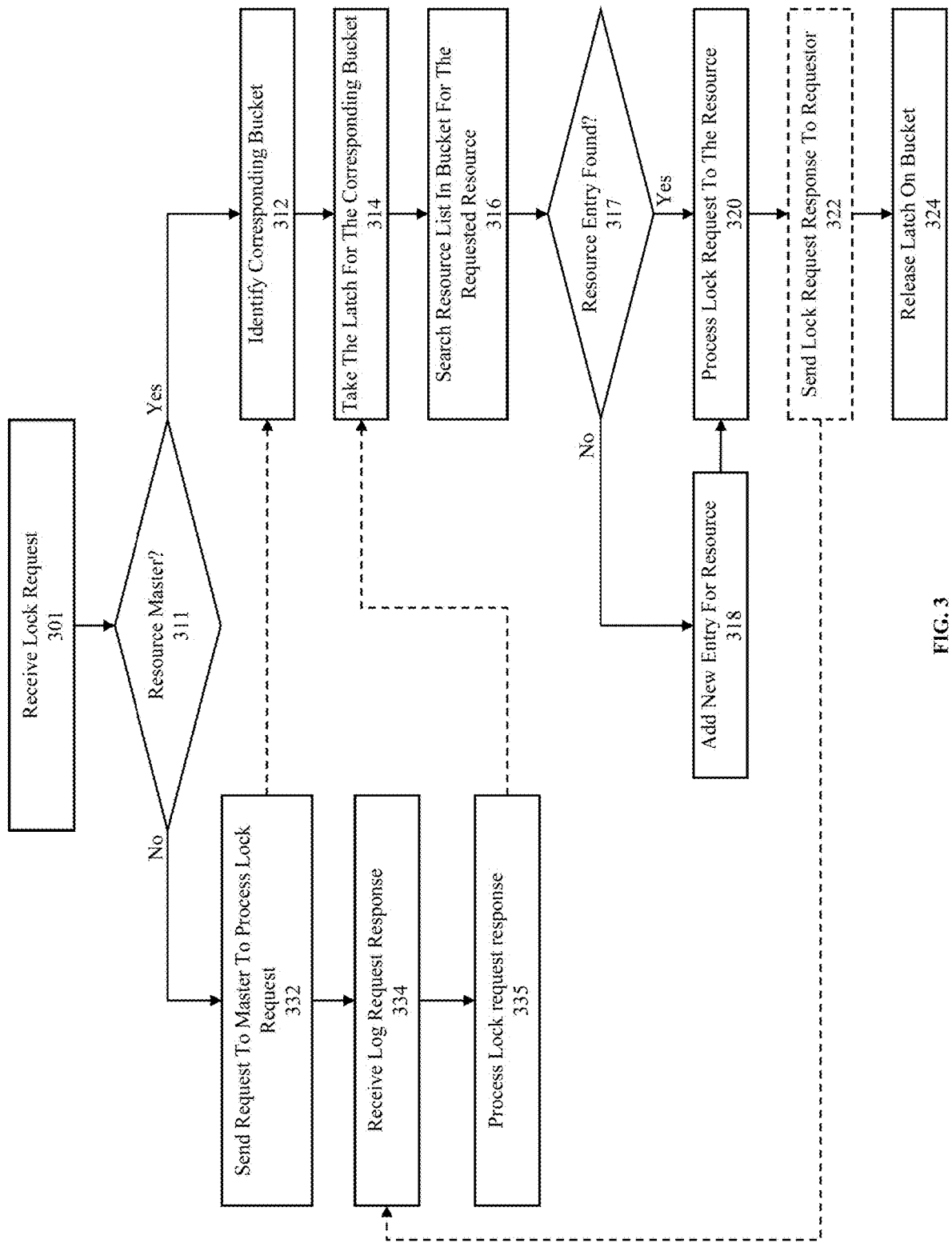
FIG. 3 illustrates a flow for processing a lock request according to some embodiments.

FIG. 3 illustrates a flow for processing a lock request according to some embodiments. As will be discussed below, processing a lock request may require multiple operations, and may even require communication between two computing nodes.

Generally, the flow starts what a lock request is received (see 301). Such a lock request might be received from a process on the computing node (see e.g., 120a1-ax). How that request is handled depends on whether the computing node that receives the request is the master of the resource (see 311).

If a receiving computer node is the master of the resource the process proceeds to 312 where a corresponding bucket is identified. For instance, the bucket might be identified by applying a hashing algorithm to a name, identifier, or both of the resource, or performing a look up against a set of mapping information (see e.g., 204). Once the corresponding bucket has been identified a latch may be taken on that bucket (see 314). With the latch acquired, the flow can then proceed to traverse the data structure of the resource list in the identified bucket to determine whether a corresponding resource entry already exists (see 317). If no resource entry is found a new entry may be added (at 318). A discussion of how to add a new entry is provided further below at least in regard to FIG. 4. Either after a positive determination at 317 or after the new entry has been added at 318, the process proceeds to 320.

At 320 the lock request to the resource is processed. Generally, a lock cannot be granted until any other conflicting locks have been released. Thus, if there are no conflicting locks, the process may update the entry to indicate that the requesting process holds a lock on the resource. However, if there is another lock that conflicts, the process may place the lock request into a queue (e.g., in the entry) that identifies the process and request (including a type of lock requested). Such a queued request could be granted at a later time after any conflicting locks have been released. As provided herein there are a number of known lock types. Such lock types can be included herein such as a concurrent read, concurrent write, protected read, protected write, or exclusive lock. Likewise, a response may be provided to the requestor and the latch on the bucket can be released. In some embodiments, the computing node on which the process executes is also identified in the entry as well as the computing node that is the master of the resource.

If, on the other hand, at 311 it is determined that the computing node is not the resource master, the process proceeds to 332 where the current computing node sends the request or one based on that request to the resources master. For example, if a process on computing node (A) requests a lock to a resource that computing node (A) is not the master of, the computing node (A) will determine which computing node (e.g., B) is the master of that resource—e.g., based on the mapping information discussed at least in regard to item 204. Computing node (A) then forwards the original request or another request based on the original request to the computing node (B) which is the master of the resource. Said request is then processed as discussed at least above in regard to items 312, 314, 316-318, 320, and 324. The entry may also identify both the process and the computing node which was granted the lock. Finally, the flow at 322 will also generate a response to the requestor (e.g., computing node A) to indicate that the lock was granted which is received by the non-master computing node at 334. Subsequently, the non-master computing node executes its own flow to process the lock request locally (see 335 and 312, 314, 316-318, 320, and 324). In some embodiments, a lock request may be rejected and a corresponding rejection message may be sent. In some embodiments, a lock request may be queued until it may be granted, after which a lock grant message may be transmitted.

In some embodiments, a computing node that is not the resource master may first determine locally whether it can grant a lock under the lock already issued to the computing node (e.g., by implementing the functions associated with 312, 314, 316, 317, 320, and 324). For example, if a corresponding entry already exists, that entry may be analyzed to determine whether the lock request can be granted based on already existing rights. If a lock request cannot be granted based on existing rights that request may be processed as discussed herein my sending a lock request to the resource master.

Figure 4:
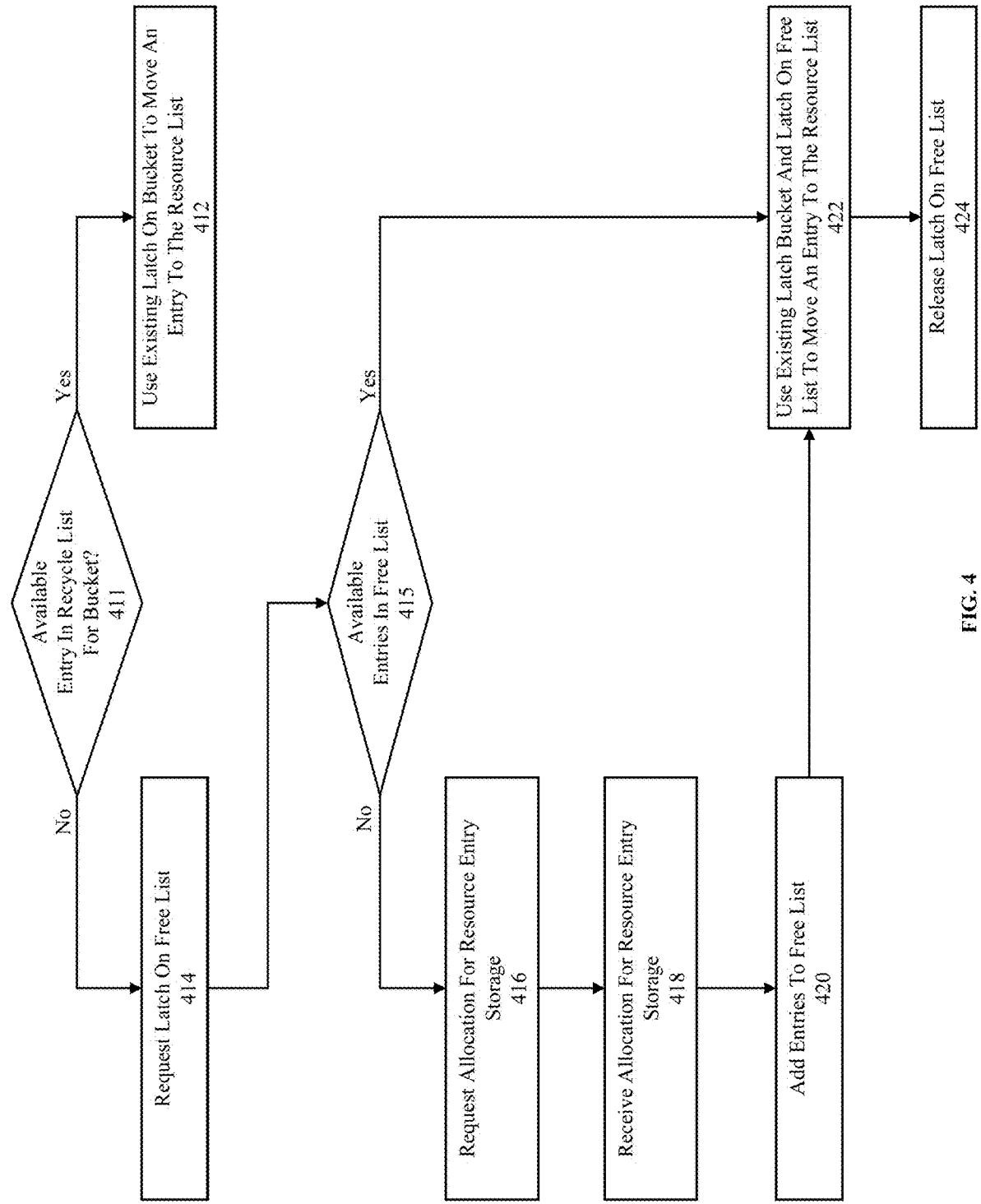
FIG. 4 illustrates a flow for adding a new entry for a resource to a resource list according to some embodiments.

FIG. 4 illustrates a flow for adding a new entry for a resource to a resource list according to some embodiments. As will be discussed below, the flow may move an entry from the recycle list using a latch already granted for the corresponding bucket, may move an entry from the free list using an additional latch, or request an allocation for a resource entry or collection thereof.

The process starts at 411 where it is determined whether there are any available entries in the recycle list. If there is an available entry it will be moved from the recycle list to the resource list at 412. In some embodiments, failure to find an available entry in the recycle list can be used as a trigger to allocate a number of entries to the recycle list.

However, if the recycle list does not have any available entries a latch is requested on the free list at 414 while retaining the latch for the bucket. This allows for access and management of the free list for making an entry allocation. If it is determined, at 415, that there is an available entry in the free list it will be moved from the free list to the resource list at 422. After which the latch on the free list is released (see 424).

On the other hand, if the free list does not have any available entries, the process proceeds to 416 where a request for an allocation for storage for at least the entry is requested from a storage (e.g., from random access memory). Subsequently, the allocation is received at 418 and one or more entries are added to the free list at 420 before the process proceeds to 422 as discussed above.

Figure 5:
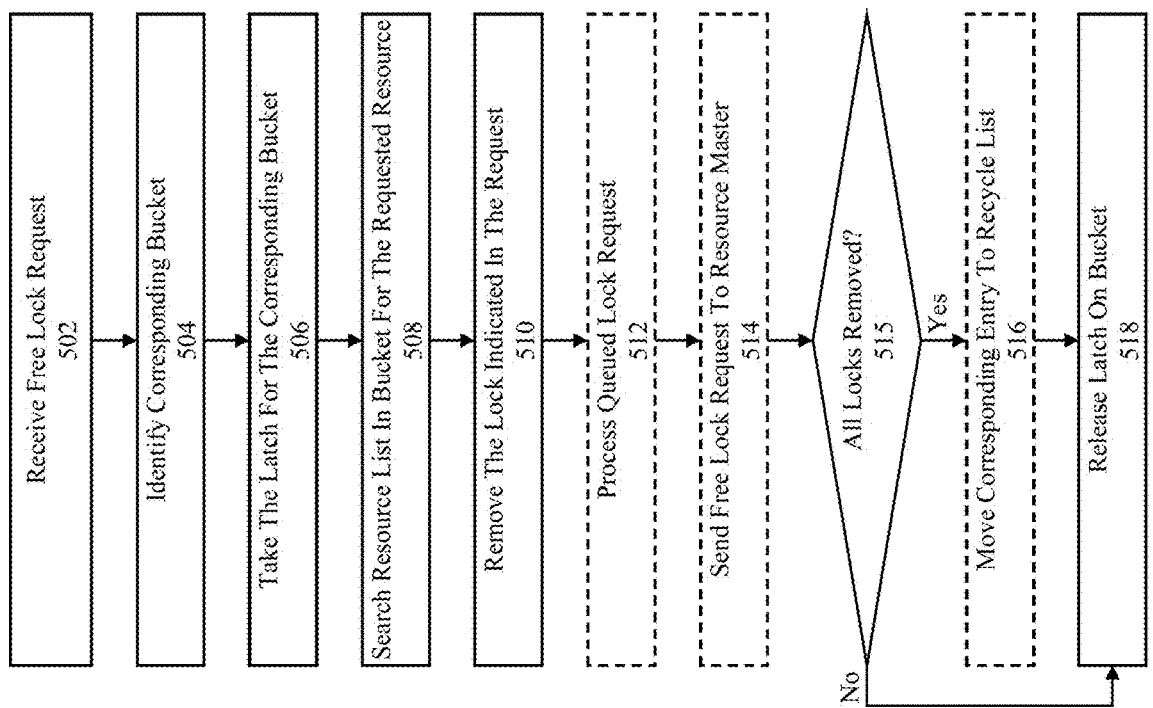
FIG. 5 illustrates a flow for processing a free lock request according to some embodiments.

FIG. 5 illustrates a flow for processing a free lock request according to some embodiments. As will be discussed below, the flow may move an entry from a resource list in a corresponding bucket to that same buckets recycle list. In some embodiments, a free lock request may be processed by two different computing nodes—e.g., at a computing note that is executing the process and at a computing node that is the master of the resource.

Generally, the process starts when a free lock request is received at 502. For example, a process might issue a close file command which gets processed to generate the free lock request. In some embodiments, a free lock request might be generated automatically when a process is shutdown or completes. When a free lock request is received it is first processed by identifying a corresponding bucket at 504 (e.g., using a hash function based on information received in the free lock request). A latch is then taken for the corresponding bucket at 506. In some embodiments, the latch must be released by another process before being taken by a current process for processing the free lock request. In some embodiments, a free lock request may be received from the corresponding master of the resource.

Once the latch has been taken, the process can search the resource list in the bucket for the specified resource at 508—e.g., search for a resource entry. If found, the process can remove the lock from the resource at 510. Removal of a lock may be completed using any appropriate technique and will generally depend on the form that the entry takes. For instance, a lock field may be marked as expired, deleted, or otherwise void, or one or more values or fields may be removed or set to a default value to remove the lock. In some embodiments, there may be multiple locks on any given resource (e.g., multiple locks of types that can be held at the same time). In some embodiments, there is a queue of lock requests pending for a given entry. For instance, each entry might include a queue for storing lock requests that are pending grant, in which upon release of a lock, a next pending lock request is processed to see if it can be granted. Additionally, if there are multiple pending lock requests, a first pending lock request can be processed, and if granted a next pending lock request is processed and potentially granted and so on. Any granted lock request may also be associated with a response or notification message to the corresponding requestor indicating that the requested lock has been granted. In this way, lock requests are processed in order of receipt. Generally, if there are no other locks on the resource but there is at least one pending lock request then at least one pending lock request will be granted. If the entry represents a resource that the current node is not the master of, then at 514 the process will send a corresponding free lock request to the resource master. Said resource master would then perform essentially the same processes (e.g., the flow illustrated in FIG. 5).

At 515 it is determined whether all locks on the resource have been removed. As a functional matter this may only require processing the corresponding entry to determine if there are any locks currently granted. However, logically, this accounts for any pending lock requests because even an exclusive lock will be granted if there are no other locks. If all locks have not been removed from the resource, the process proceeds to 518 where the latch is released and the free lock request processing is completed (potentially after sending a confirmation message).

However, if at 515 it is determined that all locks have been removed, additional processing may occur. Specifically, in some embodiments, the approach implements an inline memory recycling process at 516, where the corresponding entry is moved to the recycle list in the same bucket. Since access is controlled using a single latch for any given resource list and the corresponding recycling list in the same bucket, a resource entry that is no longer in use may be quickly moved to the recycling list. However, in some embodiments, entries that are no longer in use can be left in place without moving those entries to the recycling list immediately (see e.g., FIGS. 6 and 7 for additional approaches to manage at least entries). The process then proceeds to 518 where the latch is released as discussed above. In some embodiments, locks are given for a limited period of time and thus traversal of a resource list may identify locks that are no longer valid due to expiration.

Figure 6:
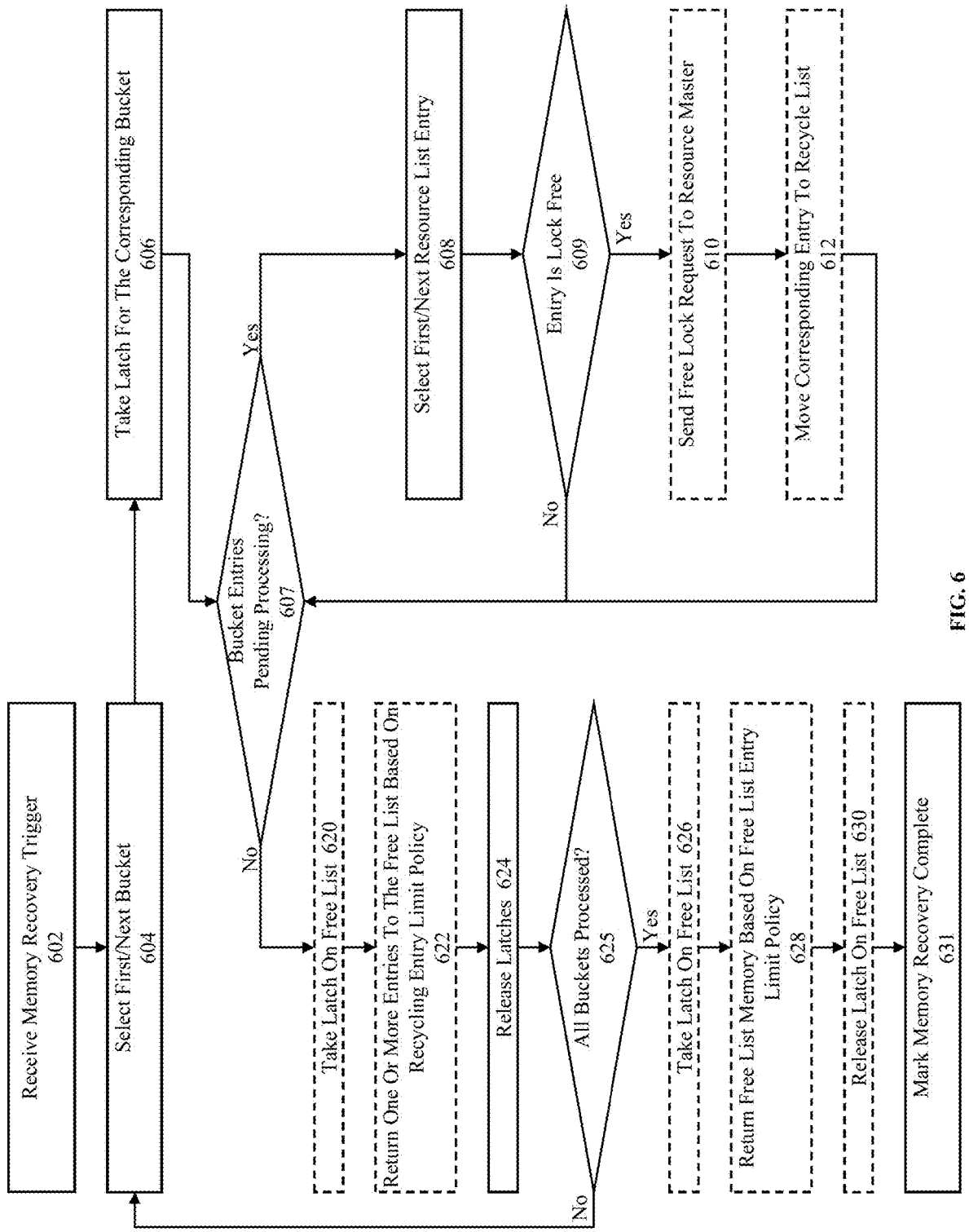
FIG. 6 illustrates a flow for memory cleanup operations according to some embodiments.

FIG. 6 illustrates a flow for memory cleanup operations according to some embodiments. As will be discussed below, the flow may process one or more portions of the disclosed lists (e.g., the resource list, recycle list, and the free list) to manage memory used by the corresponding processes. In some embodiments, one or more or even all of the computing nodes may execute the indicated process in any permutation as discussed herein.

In some embodiments, the flow starts upon receipt of a memory recovery trigger at 602. For instance, memory recovery may be triggered in any way that is appropriate such as based on a periodic or scheduled process that triggers memory recovery, in response to an on-demand command by a user or administrator, or based on one or more (a set) of conditions corresponding to memory usage of the resource table or the corresponding lists (e.g., memory pressure on the memory of the corresponding computer node and the usage of respective resource lists, recycle lists, the free list, or any combination thereof). The first/next bucket is selected at 604 and a corresponding latch is taken at 606.

In some embodiments, the approach will traverse each resource list in the resource table to determine whether there are any entries that can be freed (e.g., entries that do not represent a current lock on a resource). For instance, at 607 a determination can be made as to whether there are any entries on the resource list in the bucket that are pending processing. For example, if the resource list comprises a linked list, the existence of a link from a current position (e.g., resource table or resource entry) to an entry would indicate that there is at least one additional entry to be processed. If there is at least one entry to be processed, then the process will select the first/next entry in the resource list at 608, and determine whether the entry is lock free (e.g., does not specify a current lock). If there is a current lock the process will return to 607 to determine if there are any more entries to be processed. However, if at 609 it is determined that the entry is lock free, the process may continue at 610 to send a free lock request to the resource master for any locks allocated to the sending computing node and the entry is moved to the recycle list in the same bucket at 612.

Once all the entries in a respective bucket have been processed the flow proceeds to 620 where a latch is taken on the free list if there are any entries to be moved from the recycle list to the free list. For instance, the recycle list may be processed using an entry limit value (see 622)—e.g., a value that specifies the maximum number of entries to be included in the recycle list. For example, if the recycling list is a linked list that is limited to three entries but has seven, the additional entries can be moved to the free list by removing the pointer to the fourth entry from the third entry in the recycle list, and adding that pointer to the fourth entry in the recycle list to the last entry in the free list. In some embodiments, the entry may be reset to an initial state. In some embodiments, entries are not reset when they are moved from the resource list to the recycle list. Instead, a respective entry may be moved as is or may be moved while also updated the status of the locks on represented by the entry (e.g., as expired or removed). In some embodiments, upon an allocation the recycle list is search in the same way that a resource list is searched to identify, if it exists, a previously generated entry during allocations and when such an entry exists, that entry is selected for restoration/movement to the resource list in order to allow for reused of previously populated information. In such an embodiment, if no match is identified a first or last entry in the recycle list or free list is selected as provided herein. In some embodiments, entries are not reset until they are allocated for use in managing locks for a new or different resource. In some embodiments, entries are reset when they are moved to the freelist but not when they are moved to the recycle lists. In some embodiments, a lock is not release immediate even upon request to release the lock when the lock is time based, where instead of releasing the lock the entry is moved to the recycle list, and the recycle list is parsed to identify expired entries as discussed herein in regard to the resource list. After any entries are moved to the free list, any latches that were taken to process the bucket can be released (e.g., the latch to that bucket and if applicable the latch to the free list) at 624. If there are additional buckets to be processed the flow returns to 604 based on the corresponding determination at 625.

If there are no further buckets to be processed, the flow proceeds to 626 where a latch is taken on the free list. Using this latch, the approach then processes the free list to return memory, cache, or storage allocated to the free list based on an entry limit policy at 628. For example, any number of entries greater than a corresponding limit (e.g., whether fixed or dynamically generated based on available capacity) are deallocated and return to a corresponding free pool for management by normal management (e.g., memory) processes. After which the latch on the free list is released (see 630) and the memory recovery process is marked as completed for the computing node at 631. In some embodiments, instead of marking the process as complete a corresponding log entry or results message is generated.

In some embodiments, only a subset of the indicated processing is completed. For instance, only the resource lists are processed as discussed at 602, 604, 606, 607, 608-610, 612, 624, 625, and 631. Alternatively, only the recycling lists are processed as discussed at 602, 604, 606, 620, 622, 624-625, and 631. Or in yet another approach, only the free list is processed as discussed at 602, 626, 628, 630, and 631. Some embodiments, combine two or more of the resource list processing, the recycle list processing, or the free list processing.

Figure 7:
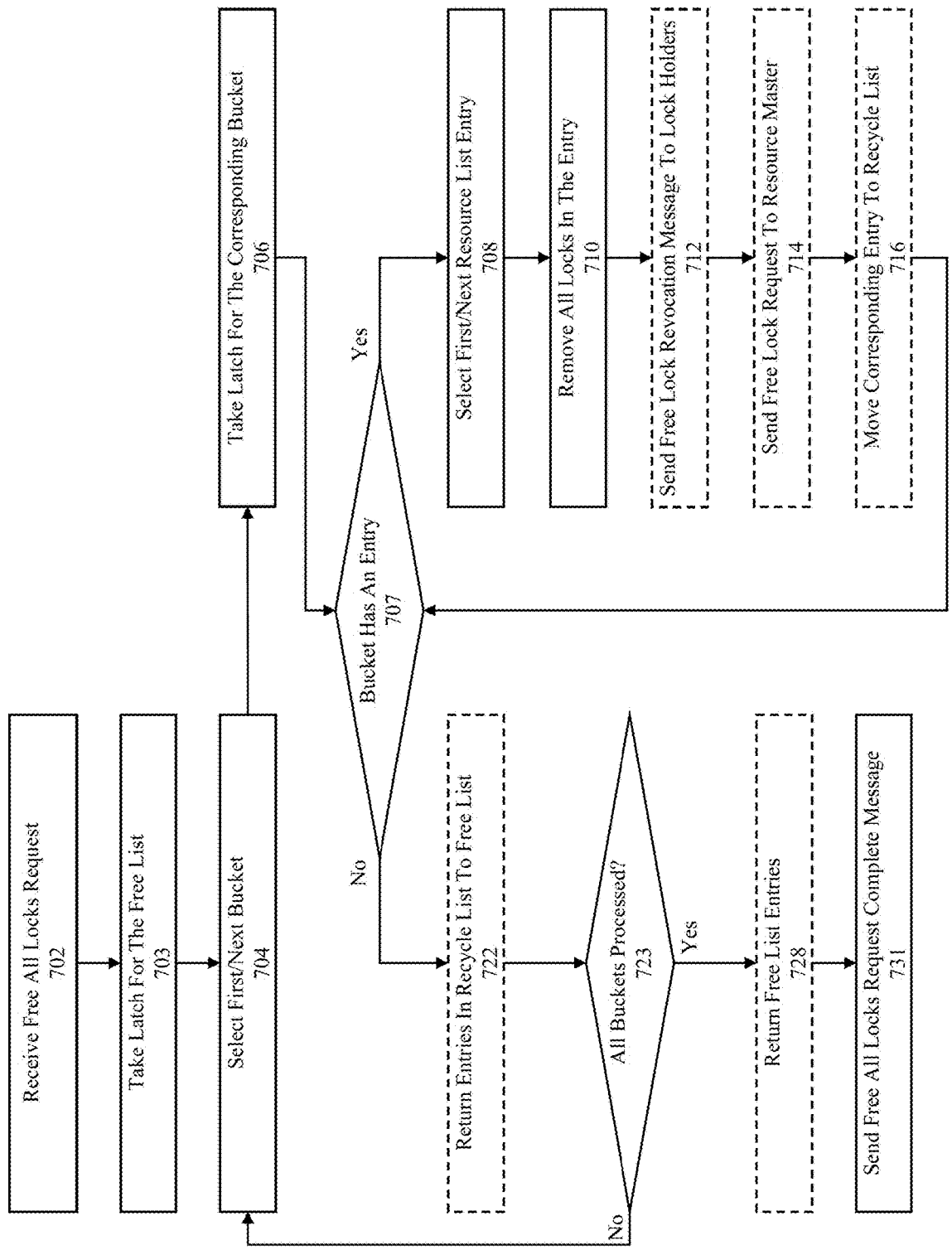
FIG. 7 illustrates a flow for freeing all locks according to some embodiments.

FIG. 7 illustrates a flow for freeing all locks according to some embodiments. Generally, such a flow would be executed upon shutdown of a computing node or resource management process. Such an approach might be taken in order to change, upgrade, or otherwise remove a computing node from a collection of computing nodes that perform the indicated resource lock management disclosed herein.

The flow generally starts when a free all locks request is received. Such a request could be triggered by any appropriate method. For instance, in response to a reboot or shutdown operation, based on detection of a crash, to perform a software configuration or version change (e.g., upgrade or downgrade), based on failure to provide a timely heartbeat or liveliness signal, or in response to an on-demand command by a user or administrator. Generally, since the free all locks request is used to at least shutdown the lock management process for resources, latches can be taken upfront and do not normally need to be released. Thus, here, the latch for the free list is taken at 703 before selecting the first/next bucket at 704 and taking the latch of the corresponding bucket at 706.

In some embodiments, the approach will traverse each resource list in the resource table to determine whether there are any entries therein to be freed. For instance, at 707 a determination can be made as to whether there are any entries on the resource list in the bucket. For example, if the resource list comprises a linked list, the existence of a link from a current position (e.g., resource table or resource entry) to an entry would indicate that there is at least one additional entry to be processed. If that is true then the process will select the first/next entry in the resource list at 708, and release all the locks in the entry therein at 710. In some embodiments, if there are any locks in the selected entry a corresponding revocation message may be sent to the lock holder at 712 (whether it is a process on the current computing node, a different computing node, or a process on a different computing node). Additionally, if the current computing node is not the resource manager a corresponding free lock request is sent to the resource master (see 714). Finally, any freed entries can be moved to the recycle list at 716. While freeing the entries in the resource list may not be strictly speaking necessary, it can serve as a useful interim processing step in the event of a failure or for when the computing node is not being shut down or restarted. After which the process returns to 707.

Once all the entries in a respective bucket have been processed the flow proceeds to 722 where the recycle list may be processed to return all entries therein to the free list. As with moving entries from the resource list to the recycle list, moving entries from the recycle list to the free list may not be strictly speaking necessary, but it can serve as a useful interim processing step in the event of a failure or for when the computing node is not being shut down or restarted. After which the process proceeds to 723 where it is determine whether all buckets have been processed. If all buckets have been processed, the free list entries can be returned to the original resource from which they are formed (e.g., they can be deallocated) at 728 and at 731 a free lock request complete message can be generated, a corresponding log entry could be created, or a status value could be set to indicate successful completion. However, if at 723 it is determined there are any additional buckets to be processed the flow returns to 704 to select the next bucket.

Figure 8:
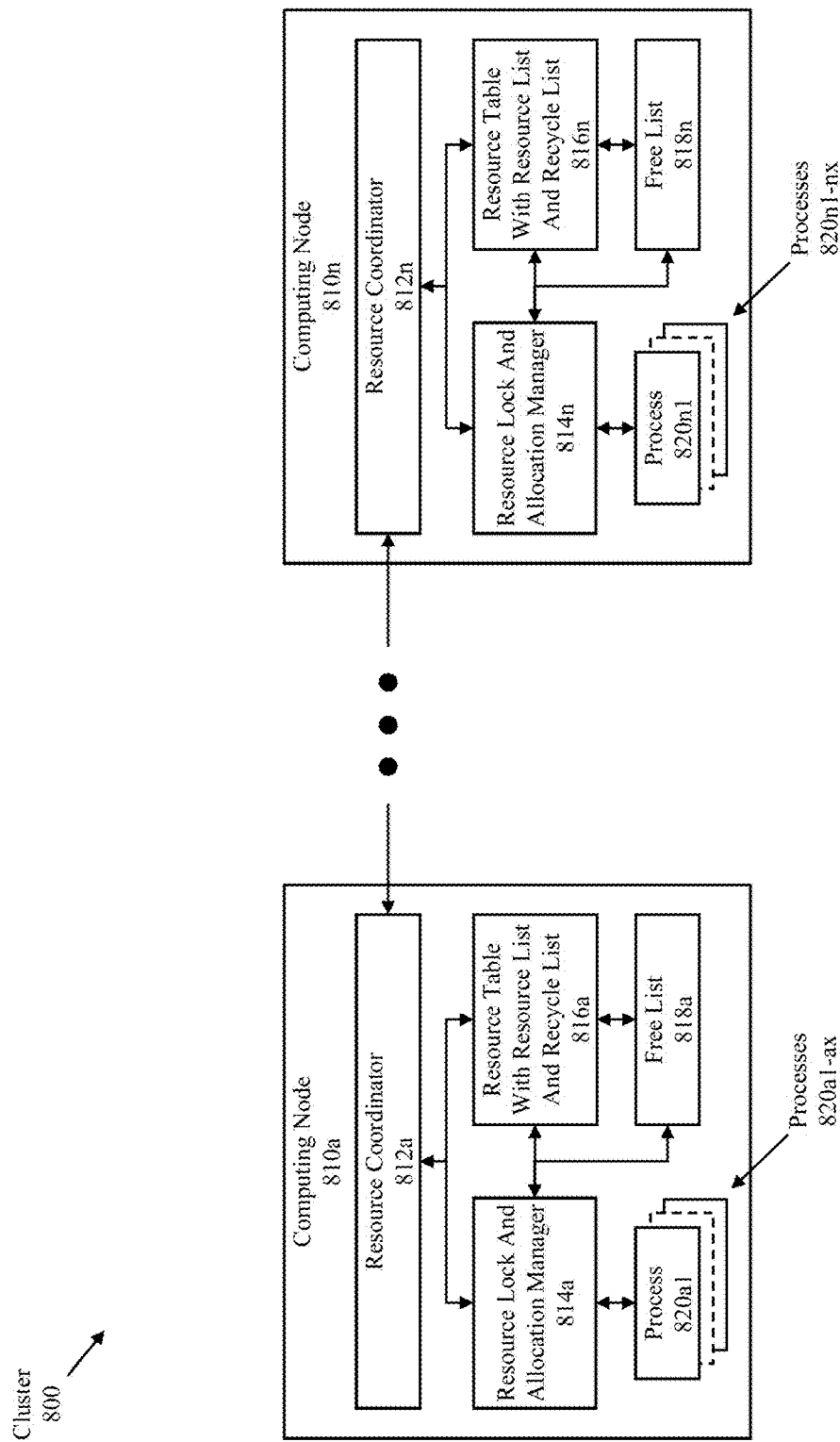
FIG. 8 is a second example system in which some embodiments of the disclosure are implemented.

FIG. 8 is a second example system in which some embodiments of the disclosure are implemented. Generally, the system includes one or more computing nodes that are interconnected and that might each include a resource management component or module for managing the grant and removal of locks on resources that may be shared across different processes as discussed herein. The system comprises a collection of computing nodes that interoperate to manage locks on resources where one node is a resource master for each respective resource and that node along with other nodes may also acquire locks on individual ones of those resources.

The system comprises a cluster 800 that may include computing nodes 810a-n. Such computing nodes may be interconnect using a network as discussed in regard to FIG. 1 (see e.g., network 130). Each computing node 810a-n might manage access to data or resources using at least a lock management approach. The data and resources can comprise any combination of data (e.g., a such as data in an object or relational database or consolidated database instances) or any other resources that may be accessible to one or more processes. Such computing devices may be able to exchange communications and be accessible using computing devices (see e.g., 101 and 101a-n discussed above in regard to FIG. 1).

In some embodiments, each process (see e.g., 820a1-ax and 820n1-nx) are equivalent to, or the same as, processes 120a1-ax discussed above in regard to FIG. 1. Likewise, each computing node (see 810a-n) includes a free list (see e.g., 818a and 818n) which may be equivalent to or the same as the free list discussed above in regard to FIG. 1 (see e.g., 118a).

However, in contrast to FIG. 1, the present figure illustrates separate elements for performing the functions discussed above in regard to the resource manager. Specifically, those elements include a resource coordinator (see e.g., 812a-n), a resource lock allocation manager (see e.g., 814a-n), and a resource table with a resource list and a recycle list (see e.g., 816a-n).

Generally, the resource coordinator is responsible for coordinating the lock requests and responses across computing nodes. In particular, any time that there is a request to create, modify, or remove a lock that is not mastered by the current node, the resource coordinator will be utilized. For instance, a lock request received from a process (e.g., 820a1) on computing node 810a to a resource for which computing node 810n is the master would be forwarded by the resource coordinator (812a) to the resource coordinator (812n) on the other computing node 810n. Likewise the computing node 812n would send any response (e.g., lock grant message) back to the original requesting node. The resource coordinators also receive lock grant messages and provide the appropriate information to the resource lock and allocation manager 814a.

The resource lock and allocation manager (see e.g., 814a-n) manages at least the free list (see e.g., 818a-n) and the resource table (see e.g., 816a-n) with the resource list and the recycle list on the corresponding computing node as discussed herein.

Figure 9A:
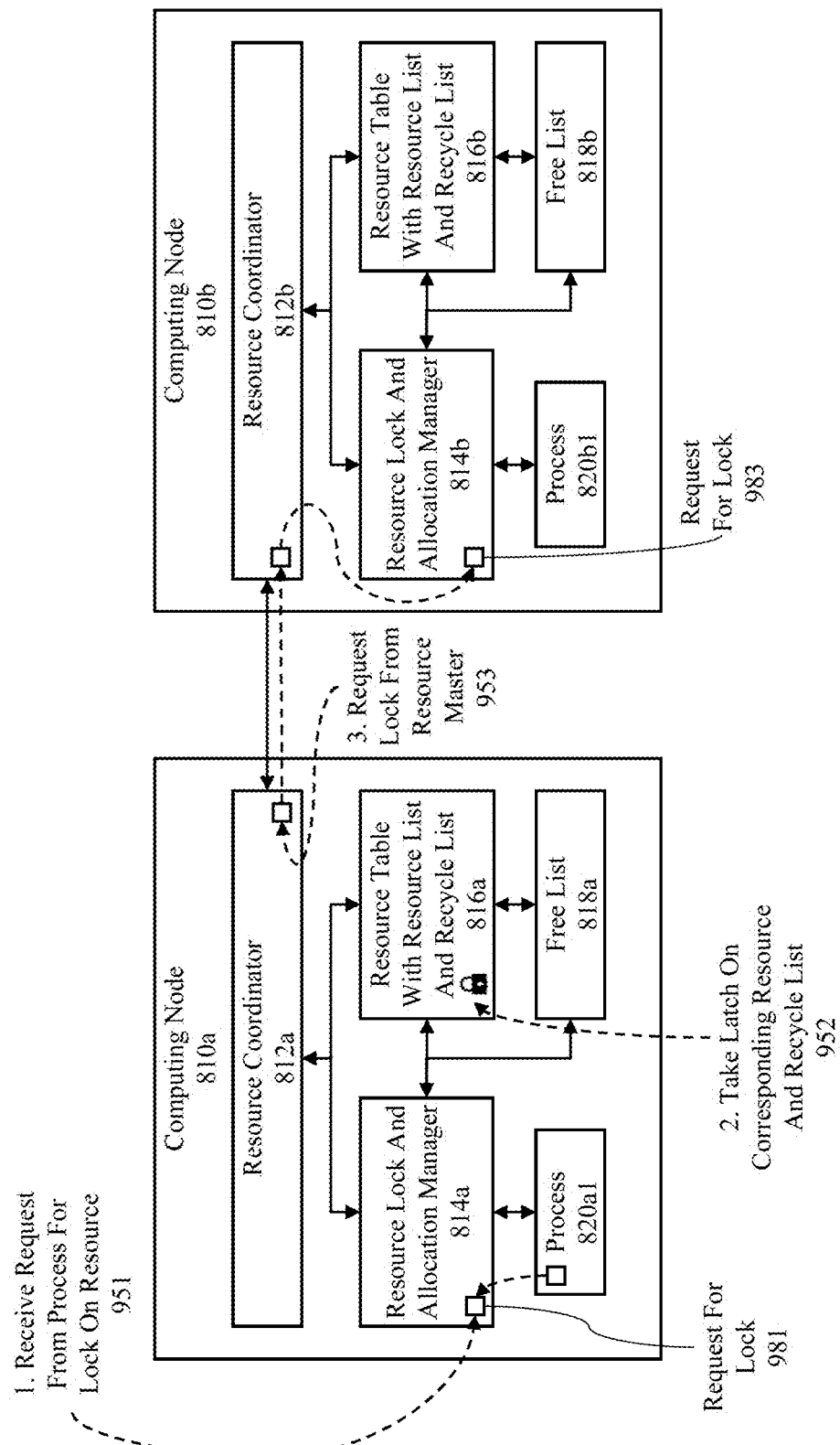
FIGS. 9A-9C illustrate a high-level example of at least some aspects of an approach for lock management according to some embodiments.
Figure 9B:
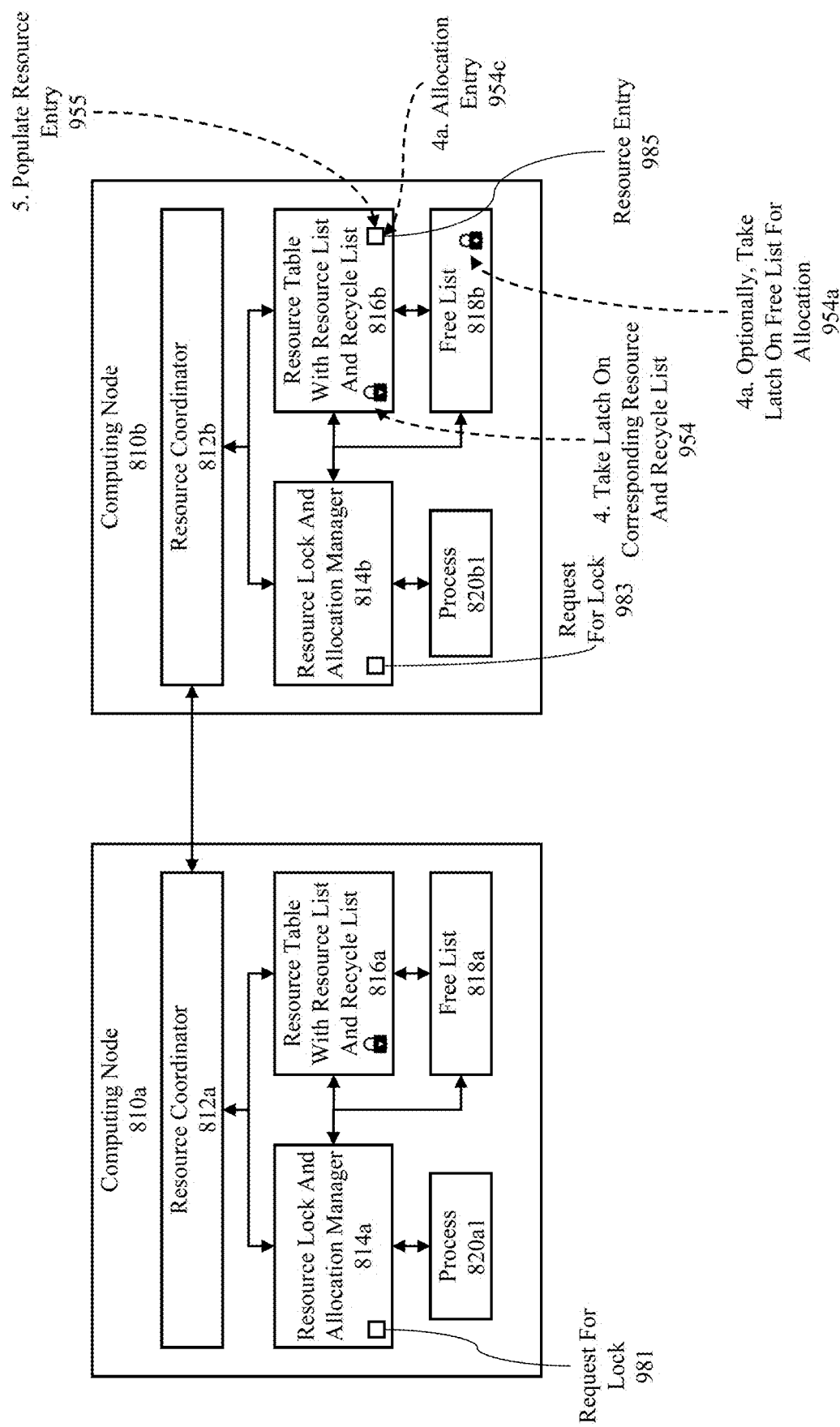
Figure 9C:
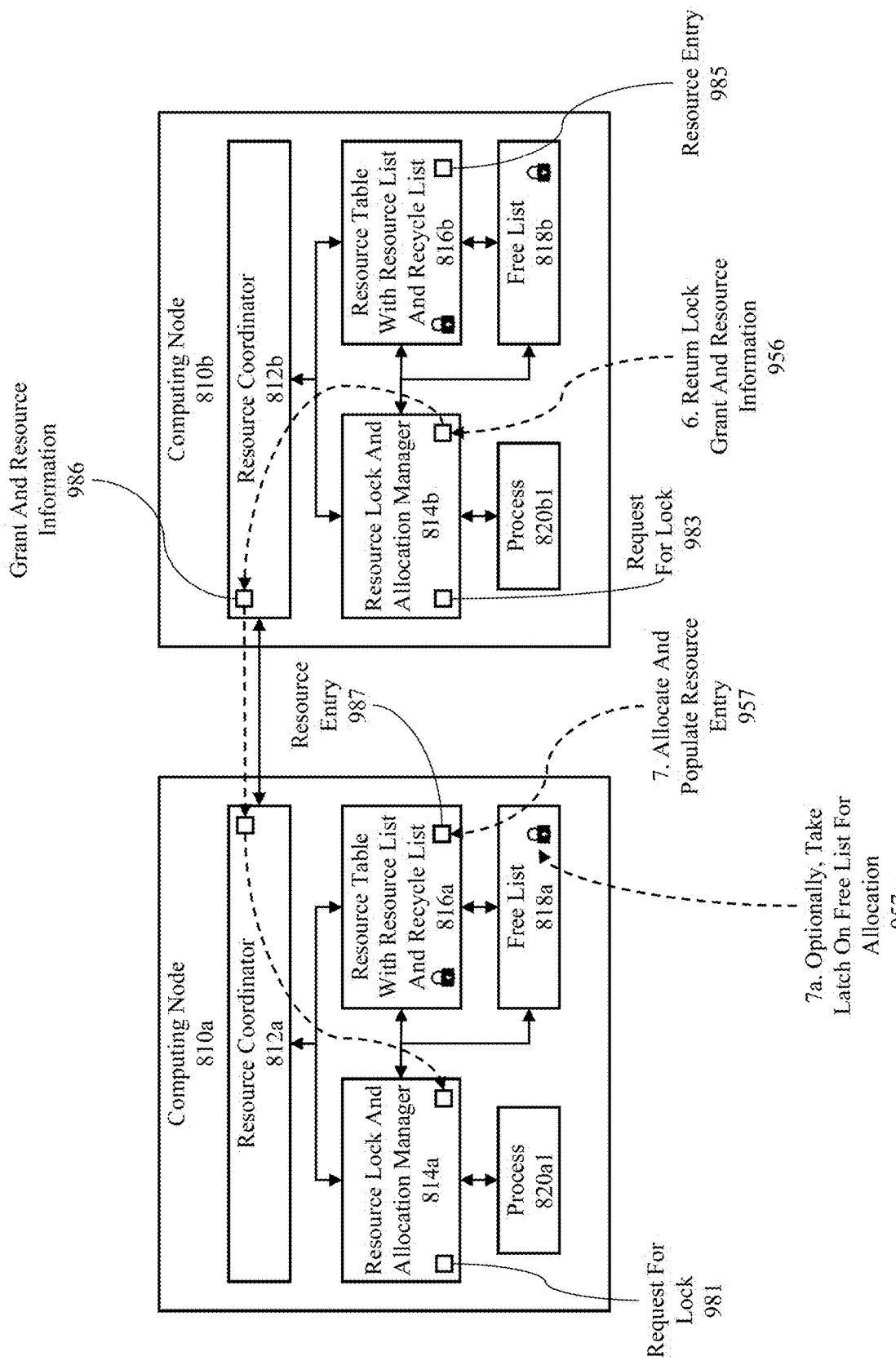

FIGS. 9A-9C illustrate a high-level example of at least some aspects of an approach for lock management according to some embodiments. The approach is illustrated with respect to FIG. 8 with like reference numbers identifying like elements and where the description for the like reference numbers in regard to FIG. 8 are applicable to FIGS. 9A-9C.

FIG. 9A illustrates a first portion of the high-level example of at least some aspects of an approach for lock management according to some embodiments.

As illustrated, the example begins when a request for a lock (see 981) is received at a resource lock and allocation manager (see e.g., 814a and 951) from a process on the computing node (see 810a). subsequently a latch is taken on the corresponding resource and recycle list (bucket) at 952. This latch can be used to traverse the resource list to determine whether a corresponding entry already exists in the resource table. For the sake of this example, we presume that there is no corresponding entry and that the computing node (810a) is not the resource master for the requested resource. Thus, the process at 953 requests a lock (see 983) from the resource master using the resource coordinators on both computing nodes (see 810a and 810b) and the resource lock and allocation manager 814b on computing node 810b. In some embodiments, the resource coordinator includes a table or other data structure to perform a search against to determine which computing node is the resource master.

FIG. 9B illustrates a second portion of the high-level example of at least some aspects of an approach for lock management according to some embodiments.

As illustrated here, the computing node that is the resource master (810b) processes the lock request by taking a latch on the corresponding resource list and recycle list (bucket) at 954, may optionally take a latch on the free list if an allocation for the entry is necessary (see 954a), optionally allocates an entry (see e.g., 985 which is either from the recycle list or the free list) at 954c and populates a resource entry at 955.

FIG. 9C illustrates a third portion of the high-level example of at least some aspects of an approach for lock management according to some embodiments.

As illustrated here, the computing node that is the resource master (810b) returns grant and resource information (986) that is routed through resource coordinators on computing node 810b (see 812b) and 810a (see 812a) from the resource lock and allocation manager 814b on 810b and to the resource lock and allocation manager 814a on 810a at 956. Once the grant and resource information are received at the resource lock and allocation manager 814a the process may optionally take a latch on the free list if an allocation for the entry is necessary (see 957a), and allocate (e.g., either from the recycle list or the free list) and populate a resource entry (987) at 957.

Figure 10:
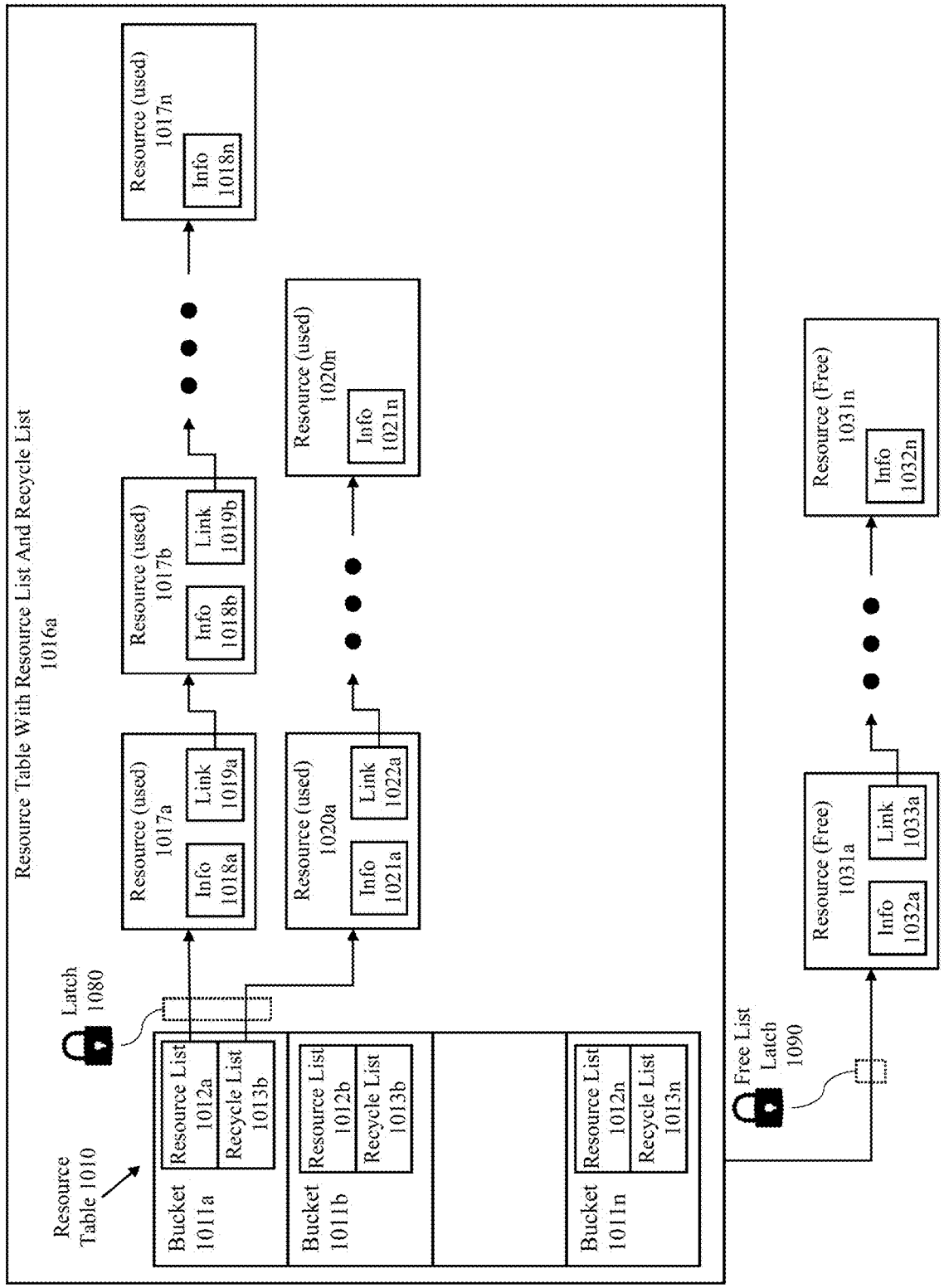
FIG. 10 is an example arrangement of the resource table and free list according to some embodiments.

FIG. 10 is an example arrangement of the resource table and free list according to some embodiments. Generally, the approach disclosed in this figure is a linked list type approach for a resource table with a resource list and a recycle list (see 1016a). As provided herein, each computing node that participates in the lock management process would include its own instance of the resource table.

As illustrated, the resource table 1010 includes a plurality of buckets (see 1011a-n) that each include at least a resource list (see e.g., 1012*a-n*) and recycle list (see e.g., 1013*a-n*) or a link thereto. Each list then includes zero to any number of entries that are formed into a list using at least a link that references the first or next entry. For example, a resource list (e.g., 1012*a*) is represented by a first field for a number of entries and a second field for a link to the first entry in the list. Similarly, a recycle list (e.g., 1013*a*) is represented by a first field for a number of entries and a second field for a link to the first entry in the list. Each entry (see 1017*a-n* and 1020*a-n*) in each list then includes a set of information (see e.g., 1018*a-n* and 1021*a-n*). Generally, the set of information comprises information about the resource such as resource identification information (e.g., resource name, etc.), links to queues the resource may be on (e.g., grant, convert, cache, etc.), statistics (e.g., a number of current waiters, grant counts, last time referenced, etc.), a basic history trail of activities against the resource for debugging purposes, or some combination thereof. Additionally, each entry, with the exception of the last entry, includes a link or pointer to the next entry in the list (see 1019*a-n* and 1022*a-n*). Moreover, access to each bucket is managed using a latch (see 1080) where a latch holder is the only entity that can modify the bucket at any given time which ensures that conflicting modifications cannot occur and also ensures that the list is not modified by another process when traversing the list.

The free list is arranged in a similar manner to both the resource list and the recycle list. Specifically, free list (e.g., 1031*a-n*) is represented by a first field for a number of entries and a second field for a link to the first entry in the list. Each entry (see 1031*a-n*) in the list also includes a set of information (see e.g., 1032*a-n*). Additionally, each entry, with the possible exception of the last entry, includes a link or pointer to the next entry in the list (see e.g., 1033*a*). Moreover, access to each bucket is managed using a latch (see 1090) where a latch holder is the only entity that can modify the bucket at any given time which ensures that conflicting modifications cannot occur and also ensures that the list is not modified by another process when traversing the list.

Figure 11A:
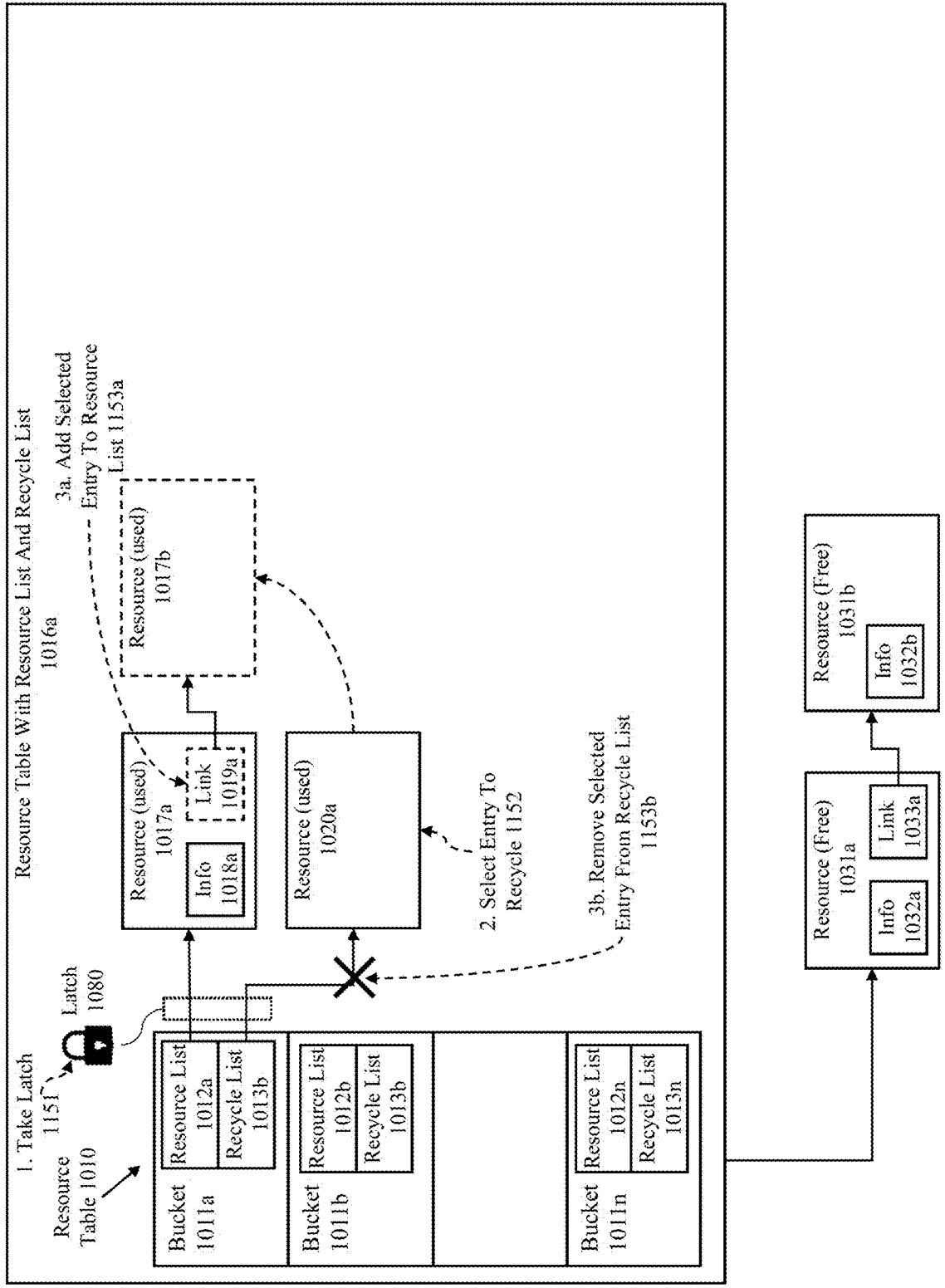

FIGS. 11A-11B illustrate allocation and population of an entry from a corresponding recycle list according to some embodiments. The approach is illustrated with respect to FIG. 10 with like reference numbers identifying like elements and where the description for the like reference numbers in regard to FIG. 10 are applicable to FIGS. 11A-11B.

FIG. 11A illustrates a first portion of allocation and population of an entry from a corresponding recycle list according to some embodiments.

As an initial matter, this example starts with a resource list having one entry, a recycle list having one entry, and a free list having two entries. The number of entries illustrated here was determined solely for purposes of illustration and is not intended to be limiting to the number of entries that can be in any list as provided herein.

The approach starts at 1151 when a latch is taken on the corresponding bucket. Subsequently, an entry is selected to be recycled (see 1152). To recycle the entry, a link in the last entry of the resource list (see 1019*a*) is added or updated to point to the to be recycled entry (see e.g., 1020*a* and 1017*b* and 1153*a*). Additionally, in order to remove the to be recycled entry from the recycle list, the link to said entry is removed (see 1153*b*).

FIG. 11B illustrates a second portion of allocation and population of an entry from a corresponding recycle list according to some embodiments.

As illustrated in FIG. 11B, the entry (previously 1020*a* now 1017*b*) has been recycled from the recycle list using the same latch. In order to complete the approach, the relevant information is populated at 1154 (see 1018*b*) such as by adding the information for the process(es) with a lock and resource identification information. In some embodiments, an entry count is updated for the recycle list and the resource list. Subsequently, the latch is released at 1155.

Figure 12A:
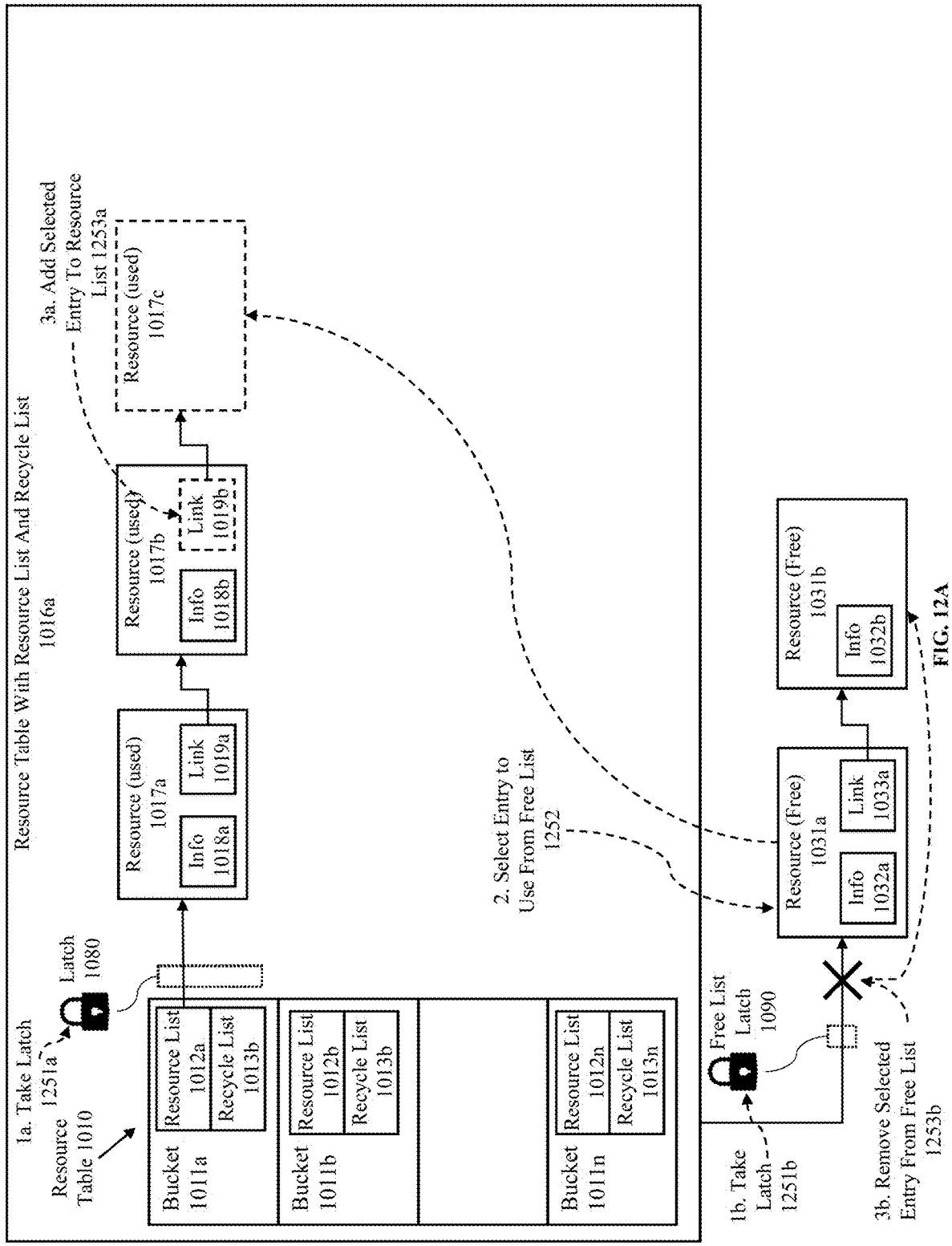
FIGS. 12A-12B illustrate allocation and population of an entry from a free list according to some embodiments.
Figure 12B:
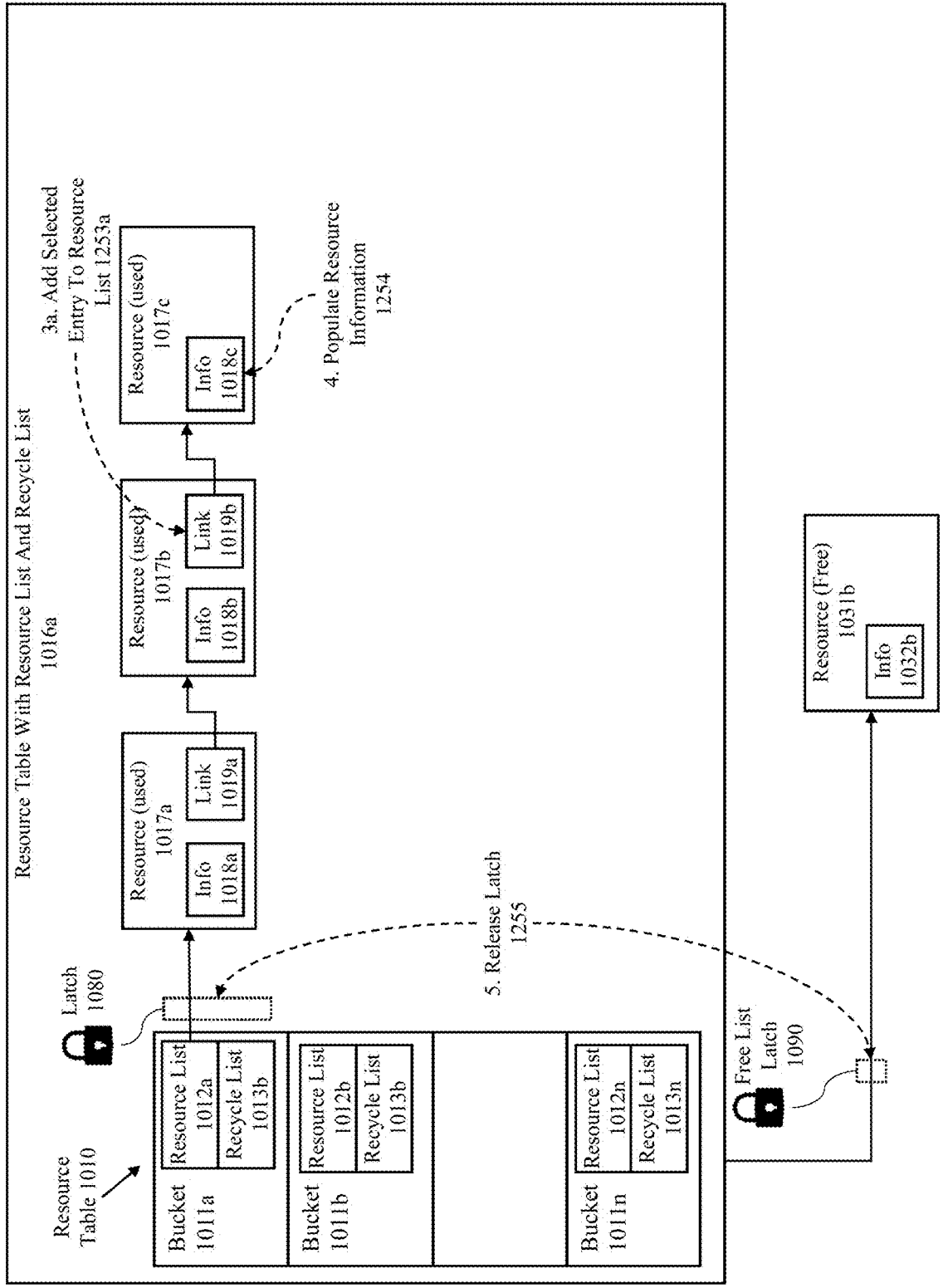

FIGS. 12A-12B illustrate allocation and population of an entry from a free list according to some embodiments. The approach is illustrated with respect to FIG. 10 with like reference numbers identifying like elements and where the description for the like reference numbers in regard to FIG. 10 are applicable to FIGS. 12A-12B. Additionally, the FIG. 12A-12B continue the example of FIGS. 11A-11B.

FIG. 12A illustrates a first portion of allocation and population of an entry from the free list according to some embodiments.

The approach starts at 1251*a* when a latch is taken on the corresponding bucket. Additionally, at 1251*b* a latch is taken on the free list—e.g., because an allocation is necessary and because the recycle list does not have any available entries. Subsequently, an entry in the free list is selected to be use (see 1252). To use the entry, the link in the last entry of the resource list (see 1019*b*) is added or updated to point to the selected entry (see e.g., 1031*a* and 1017*c*, and 1253*a*). Additionally, in order to remove the entry from the free list, the link to said entry is removed (see 1253*b*)—e.g., by changing it to reference the next entry in the free list (see 1031*b*).

FIG. 12B illustrates a second portion of allocation and population of an entry from the free list according to some embodiments.

As illustrated in FIG. 12B, the entry (previously 1031*a* now 1017*c*) has been removed from the free list using free list latch (see 1090) and added to the resource list using the corresponding bucket latch (see 1080). In order to complete the approach, the relevant information is populated at 1254 (see 1018*c*) such as by adding the information for the process(es) with a lock and resource identification information. In some embodiments, an entry count is updated for the recycle list, the resource list, and the free list. Subsequently, the latches (e.g. 1080 and 1090) are released at 1255.

Figure 13A:
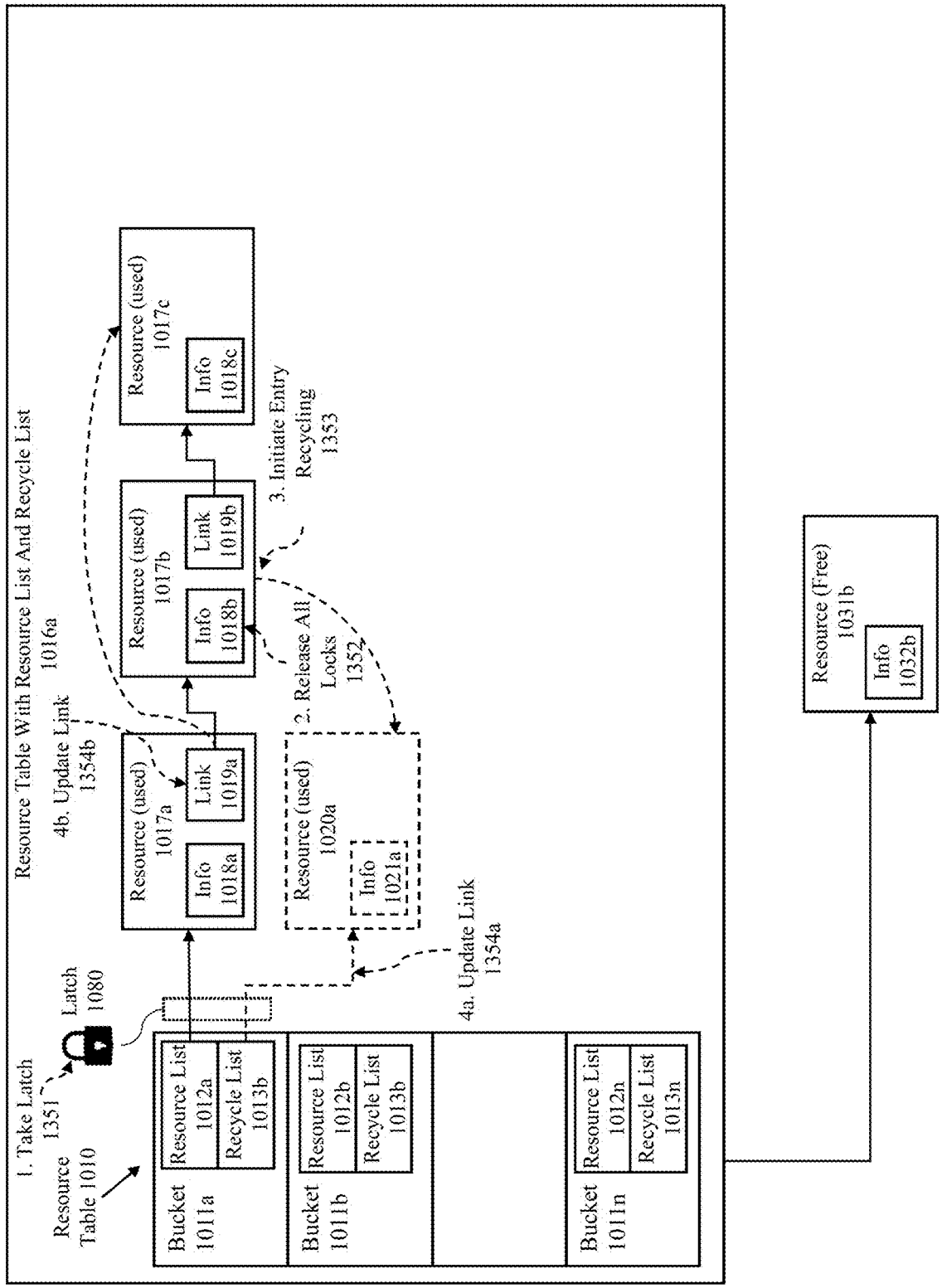
FIGS. 13A-13B illustrate recycling of an entry from the resource list according to some embodiments.
Figure 13B:
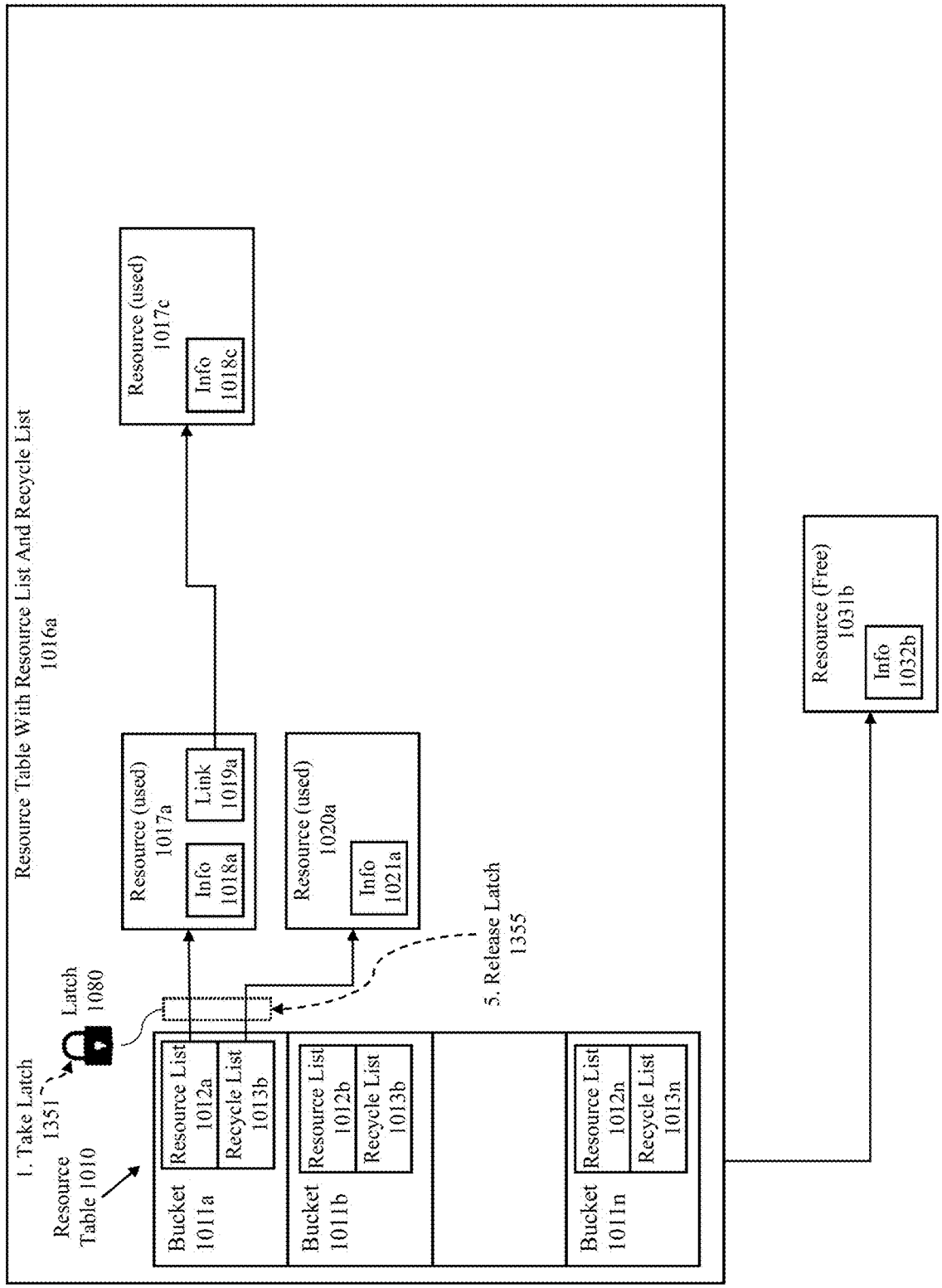

FIGS. 13A-13B illustrate recycling of an entry from the resource list according to some embodiments. The approach is illustrated with respect to FIG. 10 with like reference numbers identifying like elements and where the description for the like reference numbers in regard to FIG. 10 are applicable to FIGS. 13A-13B. Additionally, the FIG. 13A-13B continue the example of FIGS. 12A-12B.

FIG. 13A illustrates recycling an entry from the resource list according to some embodiments.

The approach starts at 1351 when a latch is taken on the corresponding bucket. Subsequently, an event occurs that causes all locks on a resource represented by an entry (see 1017*b* and 1352) in the resource list (see 1012*a*) to be released. Recycling of the entry is then initiate at 1353. To recycle the entry, it must be moved to the recycle list. This is performed using two steps. In one step, a pointer to the entry is added to the recycle list (see 1354*a*). In another step, a pointer that previously pointed to the entry (see e.g., 1019*a*) is updated to point to the entry after the entry being removed (see 1017*c*) at (1354*b*). If the entry being recycled is the last entry in the resource list the pointer can instead be cleared or deleted.

FIG. 13B illustrates a result of recycling an entry from the resource list according to some embodiments.

As illustrated in FIG. 13B, the entry (previously 1017b now 1020a) has been removed from the resource list using only the corresponding bucket latch (see 1080). In some embodiments, the information there is cleared or deleted (see 1021a). In some embodiments, the latch is release at 1355.

System Architecture

Figure 14:
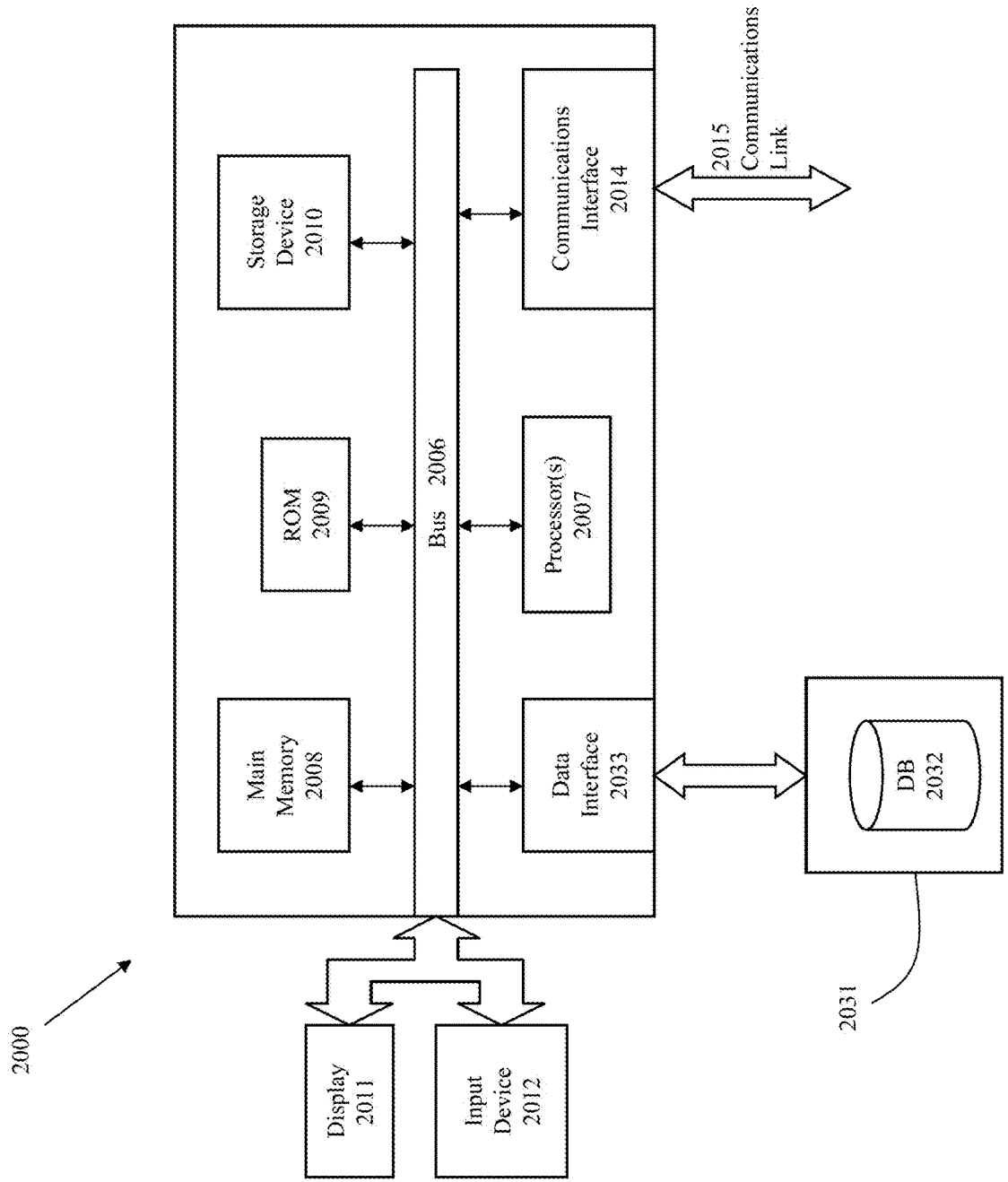
FIG. 14 is a block diagram of an illustrative computing system suitable for implementing an embodiment of the present invention.

FIG. 14 is a block diagram of an illustrative computing system 2000 suitable for implementing an embodiment of the present invention. Computer system 2000 includes a bus 2006 or other communication mechanism for communicating information, which interconnects subsystems and devices, such as processor 2007, system memory 2008 (e.g., RAM), static storage device 2009 (e.g., ROM), disk drive 2010 (e.g., magnetic or optical), communication interface 2014 (e.g., modem or Ethernet card), display 2011 (e.g., CRT or LCD), input device 2012 (e.g., keyboard), and cursor control.

According to one embodiment of the invention, computer system 2000 performs specific operations by processor 2007 executing one or more sequences of one or more instructions contained in system memory 2008. Such instructions may be read into system memory 2008 from another computer readable/usable medium, such as static storage device 2009 or disk drive 2010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2007 for execution. Such a medium may take many forms, including but not limited to, non-volatile media and volatile media. Non-volatile media includes, for example, optical or magnetic disks, such as disk drive 2010. Volatile media includes dynamic memory, such as system memory 2008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 2000. According to other embodiments of the invention, two or more computer systems 2000 coupled by communication link 2015 (e.g., LAN, PTSN, or wireless network) may perform the sequence of instructions required to practice the invention in coordination with one another.

Computer system 2000 may transmit and receive messages, data, and instructions, including program, i.e., application code, through communication link 2015 and communication interface 2014. Received program code may be executed by processor 2007 as it is received, and/or stored in disk drive 2010, or other non-volatile storage for later execution. Data may be accessed from a database 2032 that is maintained in a storage device 2031, which is accessed using data interface 2033.

Figure 15:
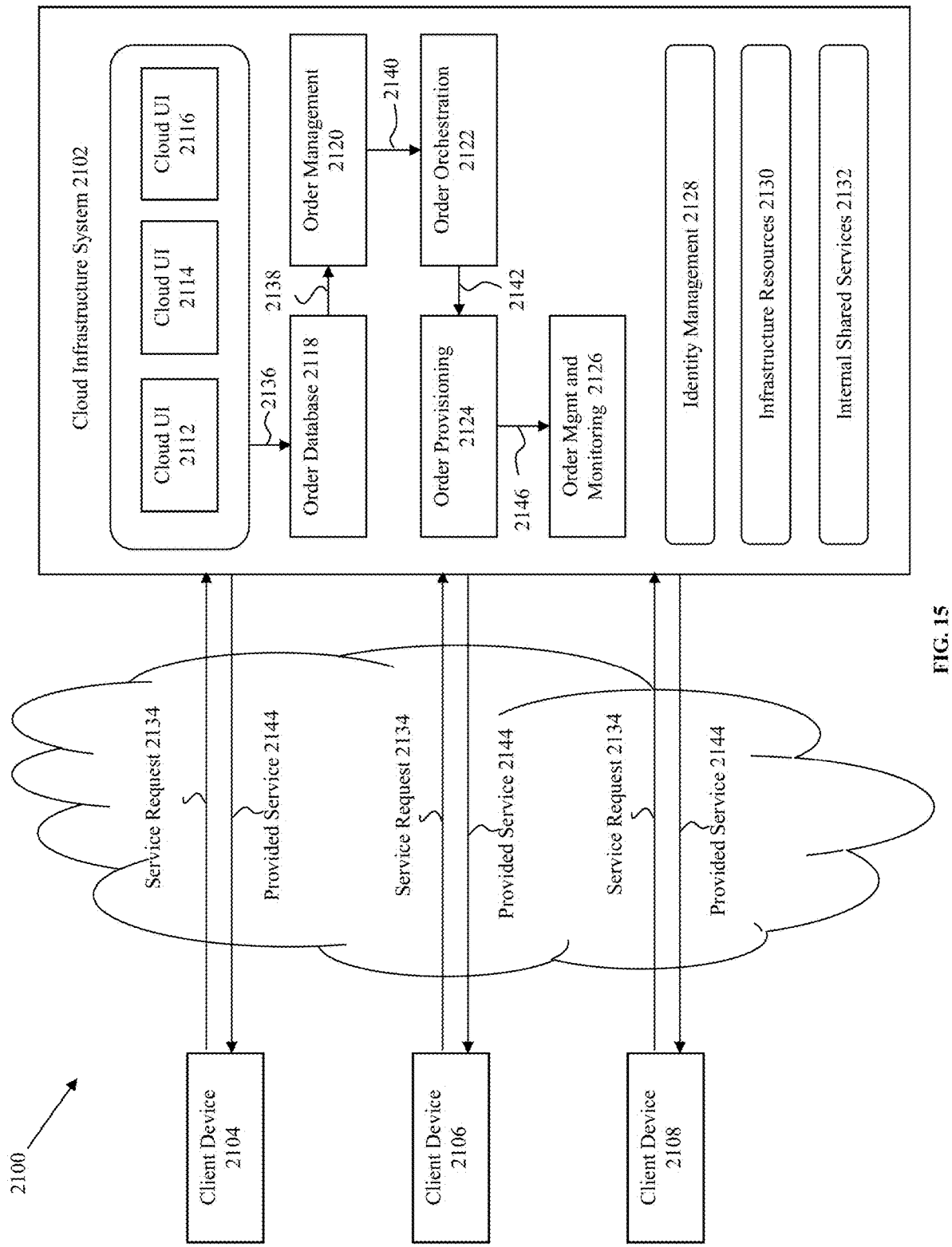
FIG. 15 is a simplified block diagram of one or more components of a system environment by which services provided by one or more components of an embodiment system may be offered as cloud services, in accordance with an embodiment of the present disclosure.

FIG. 15 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application, or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for FIG. 14. Although system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially available protocols. Cloud infrastructure system 2102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116. At operation 2136, the order is stored in order database 2118. Order database 2118 can be one of several databases operated by cloud infrastructure system 2118 and operated in conjunction with other system elements. At operation 2138, the order information is forwarded to an order management module 2120. In some instances, order management module 2120 may be configured to perform billing and accounting functions related to the order, such as verifying the order, and upon verification, booking the order. At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2102 and the physical implementation layer that is used to provision the resources for providing the requested services. Order orchestration module 2122 may thus be isolated from implementation details, such as whether or not services and resources are provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2102 may include an identity management module 2128. Identity management module 2128 may be configured to provide identity services, such as access management and authorization services in cloud infrastructure system 2102. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for fast reuse of locking data structures prior movement of entries to a cache free list addresses at least some of the issues of prior techniques suffer from, by alleviating the necessity to obtain two latches for every allocation and deallocation of entries for lock management.

What is claimed is:

1. A computer-implemented method comprising:
  maintaining a resource table having multiple buckets, wherein each bucket corresponds to a latch and comprises a resource list and a recycle list;
  receiving a lock request for a lock on a resource; and
  processing the lock request at least by:
    taking a latch on a bucket corresponding to the lock request, and
    allocating an entry for the resource using the latch by moving the entry from a corresponding recycle list in the bucket to a corresponding resource list in the bucket.

2. The method of claim 1, wherein moving entries between a respective resource list and a respective recycle list in the same bucket requires only one latch.

3. The method of claim 1, wherein entries are allocated to respective resource lists from a corresponding recycle list when the recycle list has remaining entries.

4. The method of claim 1, wherein entries are allocated to respective resource lists from a free list using an additional latch when a corresponding recycle list does not have any remaining entries.

5. The method of claim 4, wherein the free list is used for allocation of entries to multiple buckets and the free list is managed using a single latch.

6. The method of claim 1, further comprising:
  receiving a free lock request; and processing the free lock request at least by taking a latch on the bucket corresponding to the free lock request and removing a lock from a corresponding entry.

7. The method of claim 6, wherein removing the lock from the corresponding entry further comprises determining that the entry does not represent any current locks and moving the entry to an associated recycle list.

8. The method of claim 7, wherein moving the entry comprises at least modifying a first pointer that previously pointed to the entry by clearing the first pointer or updating the first pointer to point to a next entry and modifying or creating a second pointer to point to the entry, wherein first pointer and the second pointer correspond to different lists.

9. A non-transitory computer readable medium having stored thereon a sequence of instructions which, when executed by a processor causes a set of acts comprising:
maintaining a resource table having multiple buckets, wherein each bucket corresponds to a latch and comprises a resource list and a recycle list;
receiving a lock request for a lock on a resource; and
processing the lock request at least by:
taking a latch on a bucket corresponding to the lock request, and
allocating an entry for the resource using the latch by moving the entry from a corresponding recycle list in the bucket to a corresponding resource list in the bucket.

10. The non-transitory computer readable medium of claim 9, wherein moving entries between a respective resource list and a respective recycle list in the same bucket requires only one latch.

11. The non-transitory computer readable medium of claim 9, wherein entries are allocated to respective resource lists from a corresponding recycle list when the recycle list has remaining entries.

12. The non-transitory computer readable medium of claim 9, wherein entries are allocated to respective resource lists from a free list using an additional latch when a corresponding recycle list does not have any remaining entries.

13. The non-transitory computer readable medium of claim 12, wherein the free list is used for allocation of entries to multiple buckets and the free list is managed using a single latch.

14. The non-transitory computer readable medium of claim 9, wherein the set of acts further comprise:
receiving a free lock request; and
processing the free lock request at least by taking a latch on the bucket corresponding to the free lock request and removing a lock from a corresponding entry.

15. The non-transitory computer readable medium of claim 14, wherein removing the lock from the corresponding entry further comprises determining that the entry does not represent any current locks and moving the entry to an associated recycle list.

16. The non-transitory computer readable medium of claim 15, wherein moving the entry comprises at least modifying a first pointer that previously pointed to the entry by clearing the first pointer or updating the first pointer to point to a next entry and modifying or creating a second pointer to point to the entry, wherein first pointer and the second pointer correspond to different lists.

17. A computing system comprising:
a memory to hold a set of instructions;
a computer processor to execute the set of instructions, which when executed cause a set of acts comprising:
maintaining a resource table having multiple buckets, wherein each bucket corresponds to a latch and comprises a resource list and a recycle list;
receiving a lock request for a lock on a resource; and
processing the lock request at least by:
taking a latch on a bucket corresponding to the lock request, and
allocating an entry for the resource using the latch by moving the entry from a corresponding recycle list in the bucket to a corresponding resource list in the bucket.

18. The computing system of claim 17, wherein moving entries between a respective resource list and a respective recycle list in the same bucket requires only one latch.

19. The computing system of claim 17, wherein entries are allocated to respective resource lists from a corresponding recycle list when the recycle list has remaining entries.

20. The computing system of claim 17, wherein entries are allocated to respective resource lists from a free list using an additional latch when a corresponding recycle list does not have any remaining entries.

* * * * *